(12) United States Patent
Alon et al.

(10) Patent No.: US 12,051,416 B2
(45) Date of Patent: Jul. 30, 2024

(54) METHODS AND SYSTEMS FOR REDUCING LATENCY IN AUTOMATED ASSISTANT INTERACTIONS

(71) Applicant: GOOGLE LLC, Mountain View, CA (US)

(72) Inventors: Lior Alon, Ramat Gan (IL); Rafael Goldfarb, Hadera (IL); Dekel Auster, Tel Aviv (IL); Dan Rasin, Givatayim (IL); Michael Andrew Goodman, Oakland, CA (US); Trevor Strohman, Sunnyvale, CA (US); Nino Tasca, San Francisco, CA (US); Valerie Nygaard, Saratoga, CA (US); Jaclyn Konzelmann, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/228,948

(22) Filed: Aug. 1, 2023

(65) Prior Publication Data
US 2023/0410803 A1 Dec. 21, 2023

Related U.S. Application Data

(63) Continuation of application No. 17/243,232, filed on Apr. 28, 2021, now Pat. No. 11,763,813.

(51) Int. Cl.
*G10L 15/22* (2006.01)
*G06F 3/16* (2006.01)
(Continued)

(52) U.S. Cl.
CPC ............. *G10L 15/22* (2013.01); *G06F 3/167* (2013.01); *G10L 15/083* (2013.01);
(Continued)

(58) Field of Classification Search
CPC ... G10L 15/22; G10L 15/083; G10L 15/1815; G10L 15/285; G10L 2015/223; G06F 3/167
See application file for complete search history.

(56) References Cited

U.S. PATENT DOCUMENTS

| 9,646,601 B1 | 5/2017 | Jedrzejczak |
| 10,079,021 B1 | 9/2018 | Barra Chicote |

(Continued)

OTHER PUBLICATIONS

European Patent Office; International Search Report and Written Opinion issued in Application No. PCT/US2021/063104; 10 pages; dated Apr. 20, 2022.

*Primary Examiner* — Brian L Albertalli
(74) *Attorney, Agent, or Firm* — Gray Ice Higdon

(57) ABSTRACT

Implementations described herein relate to reducing latency in automated assistant interactions. In some implementations, a client device can receive audio data that captures a spoken utterance of a user. The audio data can be processed to determine an assistant command to be performed by an automated assistant. The assistant command can be processed, using a latency prediction model, to generate a predicted latency to fulfill the assistant command. Further, the client device (or the automated assistant) can determine, based on the predicted latency, whether to audibly render pre-cached content for presentation to the user prior to audibly rendering content that is responsive to the spoken utterance. The pre-cached content can be tailored to the assistant command and audibly rendered for presentation to the user while the content is being obtained, and the content can be audibly rendered for presentation to the user subsequent to the pre-cached content.

18 Claims, 8 Drawing Sheets

(51) Int. Cl.
*G10L 15/08* (2006.01)
*G10L 15/18* (2013.01)
*G10L 15/28* (2013.01)

(52) U.S. Cl.
CPC ........ *G10L 15/1815* (2013.01); *G10L 15/285* (2013.01); *G10L 2015/223* (2013.01)

(56) References Cited

U.S. PATENT DOCUMENTS

| | | |
|---|---|---|
| 10,777,203 B1 | 9/2020 | Pasko |
| 2014/0058732 A1 | 2/2014 | Labsky et al. |
| 2015/0206531 A1 | 7/2015 | Fujisawa |
| 2015/0206532 A1 | 7/2015 | Fujisawa et al. |
| 2018/0121508 A1 | 5/2018 | Halstvedt |
| 2018/0336449 A1 | 11/2018 | Adan et al. |
| 2019/0295552 A1 | 9/2019 | Pasko et al. |
| 2020/0027455 A1 | 1/2020 | Sugiyama et al. |
| 2022/0068264 A1 | 3/2022 | Akel |
| 2022/0351720 A1 | 11/2022 | Alon et al. |

METHODS AND SYSTEMS FOR REDUCING LATENCY IN AUTOMATED ASSISTANT INTERACTIONS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) to an automated assistant, which may in some cases be converted into text and then processed, and/or by providing textual (e.g., typed) natural language input. An automated assistant generally responds to the spoken utterances by dictating the spoken utterances, providing responsive user interface output (e.g., audible and/or visual user interface output), controlling smart device(s), and/or performing other action(s).

Automated assistants typically rely upon a pipeline of components in interpreting and responding to user requests. For example, an automatic speech recognition (ASR) engine can be used to process audio data that correspond to a spoken utterance of a user, and to generate ASR output, such as a transcription (i.e., sequence of term(s) and/or other token(s)) of the spoken utterance. Further, a natural language understanding (NLU) engine can be used to process the ASR output, and to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain responsive content to the spoken utterance. This pipeline of components can cause latency in interpreting and responding to user requests, which can be exacerbated to varying degrees based on the complexity of the user requests and/or a type of the user requests. As a result, the user may repeat the same spoken utterance thinking the automated assistant did not hear the user, or prolong the human-to-computer dialog and/or consume additional computational resources by waiting until the responsive content is received prior to the automated assistant rendering any content that is responsive to the spoken utterance.

SUMMARY

Implementations disclosed herein are directed to reducing latency in automated assistant interactions by concluding automated assistant interactions in a quicker and more efficient manner and to reducing a quantity of occurrences that user input directed to an automated assistant is repeated at a client device. In some implementations, a client device can receive audio data that captures a spoken utterance of a user. The audio data can be generated by microphone(s) of the client device. Further, the audio data can be processed to determine an assistant command to be performed by an automated assistant. The assistant command can be processed, using a latency prediction model, to generate a predicted latency to fulfill the assistant command. Further, the client device (or the automated assistant) can determine, based on the predicted latency, whether to render pre-cached content for presentation to the user prior to rendering content that is responsive to the spoken utterance for presentation to the user. In response to determining to render the pre-cached content for presentation to the user prior to the content that is responsive to the spoken utterance, the pre-cached content can be tailored to the assistant command, and can be rendered for presentation to the user while the client device (or the automated assistant) obtains the content that is responsive to the spoken utterance. Further, the content can be rendered for presentation to the user subsequent to the pre-cached content in a manner such that it appears, from the perspective of the user that provided the spoken utterance, that the pre-cached content and the content are a single output (e.g., a single instance of synthesized speech that is audibly rendered for presentation to the user and/or a single transcription that is visually rendered for presentation to the user in a streaming manner).

For example, assume a user provides a spoken utterance of "What's the weather in Louisville?", and microphone(s) of a client device of the user generate audio data that captures the spoken utterance. The audio data can be processed, using an automatic speech recognition (ASR) model, to generate ASR output, and the ASR output can be processed, using a natural language understanding (NLU) model, to generate NLU output. In this example, the assistant command can be identified based on the ASR output and/or the NLU output as a weather command. Further, an automated assistant executing at the client device can generate a request to obtain content that is responsive to the spoken utterance (e.g., a current weather forecast of "55 degrees and sunny"), and transmit the request to a remote system to obtain the content. As the automated assistant generates and transmits the request to the remote system to obtain the content, the automated assistant can, in parallel, generate a predicted latency for the automated assistant to fulfill the weather command by processing, using a latency prediction model, the ASR output, the NLU output, and/or device signal(s) associated with the client device when the spoken utterance was received at the client device. Further, the automated assistant can determine, based on the predicted latency, whether to render pre-cached content prior to rendering the content that is responsive to the request (e.g., the current weather forecast).

Assuming the automated assistant determines to render pre-cached content prior to rendering the content that is responsive to the request, the automated assistant can select a segment of pre-cached content, from among a plurality of disparate segments of pre-cached content for the weather command, to tailor to the assistant command (e.g., "Hi [NAME], [LOCATION] weather [TIME] is . . . "). Further, the automated assistant can tailor the selected segment of pre-cached content for pre-cached content to the assistant command, thereby resulting in a tailored segment of pre-cached content (e.g., "Hi John, Louisville weather right now is . . . "). As the automated assistant is rendering the tailored segment of pre-cached content for presentation to the user, the content that is responsive to the request (e.g., the current weather forecast) should be received at the client device. The content received can be synchronized with the pre-cached content, thereby resulting in, what appears to be from the perspective of the user, a single instance of synthesized speech of "Hi John, Louisville weather right now is 55 degrees and sunny". Accordingly, latency in automated assistant interactions can be reduced by rendering the pre-cached content prior to the content since the automated assistant interaction is concluded more quickly, thereby conserving computational resources at the client device. Moreover, a quantity of occurrences that the user will repeat the spoken utterance can be reduced by rendering the pre-cached content prior to the content, thereby conserving computational resources at the client device since less user inputs are received.

In some implementations, the latency prediction model can be a machine learning (ML) model (e.g., a classification model, a decision tree, and/or other ML model that is capable of being trained to generate the predicted latency) that is trained based on a plurality of training instances. Each of the training instances can include training instance input and training instance output. The training instance input, for a given training instance of the plurality of training instances can include, for example, NLU data for a given assistant command (e.g., an intent, slot value(s) for parameter(s) associated with the intent, and/or other NLU data), ASR data for the given assistant command (e.g., speech hypothes(es) and/or other ASR data), and/or one or more device signals associated with a client device when the given assistant command was received (e.g., a location of the client device, a type of the client device, a network connection type of the client device, and/or other signals). Further, the training instance output can include a ground truth latency associated with fulfillment of the given assistant command by an automated assistant.

In training the latency prediction model based on the given training instance, the training instance input can be processed, using the latency prediction model, to generate a predicted latency associated with fulfillment of the given assistant command. Further, the predicted latency generated based on processing the training instance input can be compared to the ground truth latency associated with fulfillment of the given assistant command to generate one or more losses. The latency prediction model can be updated based on the one or more losses for the given training instance (e.g., by backpropagating the one or more losses across the latency prediction model). The latency prediction model can be trained in this manner until one or more training conditions are satisfied. The training conditions can include, for example, performance of the latency prediction model satisfying a performance threshold, the latency prediction model being trained based on a threshold quantity of training instances, a threshold duration of time of training the latency prediction model, and/or other training conditions. The latency prediction model can be deployed for use by a client device when the one or more training conditions are satisfied.

In some implementations, the latency prediction model can be updated locally at a client device after it is deployed for use by the client device. For example, the automated assistant can determine an actual latency associated with fulfillment of a given assistant command, and compare the actual latency to a predicted latency associated with fulfillment of the given assistant command to generate one or more losses. The latency prediction model can be updated based on the one or more losses for the given assistant command (e.g., by backpropagating the one or more losses across the latency prediction model). Accordingly, the latency prediction model can be personalized at the client device based on assistant commands that are fulfilled at the client device and/or based on device signal(s) that are specific to the client device.

In some implementations, the plurality of disparate segments of pre-cached content, from which the segment of pre-cached content is selected, can be of different lengths such that each of the plurality of disparate segments of pre-cached content for the disparate types of assistant commands can be rendered over different durations of time. For example, a first segment of pre-cached content may be a first length and may take a first duration of time to be rendered for presentation to the user at the client device (e.g., "[LOCATION] weather [TIME] is . . . " in the above example), a second segment of pre-cached content may be a second length and may take a second duration of time to be rendered for presentation to the user at the client device (e.g., "Hi [NAME], [LOCATION] weather [TIME] is . . . " in the above example), a third segment of pre-cached content may be a third length and may take a third duration of time to be rendered for presentation to the user (e.g., "Hi [NAME], the radar for [LOCATION] says the weather [TIME] is . . . " in the above example), and so on. In this example, the second length associated with the second segment of pre-cached content may be longer than the first length associated with the first segment of pre-cached content, and, as a result, the second duration of time associated with the second segment of pre-cached content may be longer than the first duration of time associated with the first segment of pre-cached content. Further, the third length associated with the third segment of pre-cached content may be longer than the second length associated with the second segment of pre-cached content, and, as a result, the third duration of time associated with the third segment of pre-cached content may be longer than both the second duration of time associated with the second segment of pre-cached content and the first duration of time associated with the first segment of pre-cached content.

In some versions of those implementations, the automated assistant can select a given segment of pre-cached content based on comparing the predicted latency to one or more latency thresholds. For example, the automated assistant can select the first segment of pre-cached content when the predicted latency fails to satisfy a first latency threshold, select the second segment of pre-cached content when the predicted latency satisfies the first latency threshold but fails to satisfy a second latency threshold, select the third segment of pre-cached content when the predicted latency satisfies the first latency threshold and the second latency threshold, and so on. Accordingly, the automated assistant can dynamically select from among the plurality of disparate segments of pre-cached content to tailor to the assistant command based on the predicted latency for the automated assistant to fulfill the assistant command. In other words, the automated assistant can select a given segment of the pre-cached content, from among the plurality of disparate segments of pre-cached content, such that the content that is responsive to the request can be received during rendering of the pre-cached content and tacked on the rendering of the pre-cached content in a timely manner.

In some versions of those implementations, the plurality of disparate segments of pre-cached content may be specific to the assistant command. Put another way, different types of assistant commands can be associated with a corresponding plurality of disparate segments of pre-cached content. For example, weather commands can be associated with a first disparate plurality of pre-cached segments, Internet of things (IoT) device control commands can be associated with a second disparate plurality of pre-cached segments, media commands can be associated with a third disparate plurality of pre-cached segments, search query commands can be associated with a fourth disparate plurality of pre-cached segments, assistant routine commands can be associated with a fifth disparate plurality of pre-cached segments, navigation commands can be associated with a sixth disparate plurality of pre-cached segments, software application control commands can be associated with a seventh disparate plurality of pre-cached segments, and so on for a plurality of disparate types of assistant commands. In some further versions of those implementations, the latency thresholds utilized to select a given segment of pre-cached content, from among the plurality of corresponding disparate segments of pre-cached content can vary for each of the disparate types of assistant commands, whereas in other implementations, the latency thresholds utilized to select the given segment of pre-cached content may be the same.

In some implementations, the automated assistant can tailor the selected pre-cached segment to the assistant command based on information determined based on the spoken utterance, information inferred from the spoken utterance, and/or known information. In the above example where the user provided the spoken utterance "What's the weather in Louisville?", the selected segment of pre-cached content includes three parameters—[NAME], [LOCATION], and [TIME]. The automated assistant can determine a value for the [NAME] parameter based on known information about the user, such as when the user provided his or her name when configuring the automated assistant. Further, the automated assistant can determine a value for the [LOCATION] parameter based on the NLU output generated based on the spoken utterance that indicates "Louisville" is a slot value for a location parameter of the weather command. Moreover, the automated assistant can infer a value for the [LOCATION] parameter based on the NLU output generated based on the spoken utterance that indicates "current time" is a slot value for a time parameter of the weather command.

In some implementations, in transmitting requests to obtain the content (e.g., from the remote system and/or to a software application accessible at the client device), the request can include an indication that reduced data needs to be transmitted back to the client device. In the above example where the user provided the spoken utterance "What's the weather in Louisville?", the request that is transmitted to the remote system may only request that the remote system provide a temperature (e.g., 55 degrees) and adjective to describe the weather (e.g., sunny). In other words, the request can include an indication that the remote system need not transmit back a structured segment of content (e.g., "Louisville weather right now is 55 degrees and sunny") since the pre-cached content that is rendered prior to the content includes most of this content. This enables the request to be of a reduced size, thereby conserving network resources in transmitting requests and/or content over one or more networks.

Although the above example is described with respect to rendering content responsive to an assistant command, it should be understood that is for the sake of example and is not meant to be limiting. In additional or alternative implementations, the techniques described herein can be utilized to render pre-cached content when there is no content per se, such as when the assistant command controls a device (e.g., media commands, IoT device control commands, etc.). Moreover, although the above example is described with respect to rendering content responsive to a single assistant command, it should be understood that is also for the sake of example and is not meant to be limiting. In additional or alternative implementations, the techniques described herein can be utilized to render pre-cached content when the spoken utterance includes multiple assistant commands, such as when the spoken utterance initiates an assistant routine (e.g., good morning routine, good night routine, and/or other assistant routines). In these implementations, the predicted latency can be generated for the assistant routine as a whole or for one or more of the individual assistant commands included in the assistant routine. For instance, assume a given assistant routine includes a time command, a traffic command, and a weather command. In this instance, the predicted latency can be generated for each of the commands as a whole, or on the individual level.

By using techniques described herein, one or more technical advantages can be achieved. As one non-limiting example, the techniques described herein enable the automated assistant to render pre-cached content that is tailored to an assistant command while obtaining content, thereby concluding human-to-computer dialog between the automated assistant and the user in a quicker and more efficient manner. For instance, the automated assistant can begin responding to an assistant command included in a spoken utterance with the pre-cached content that is tailored to the assistant command, prior to waiting for certain content that is responsive to the spoken utterance to be obtained at the client device. As another non-limiting example, the techniques described herein enable the automated assistant to provide an indication to the user that the automated assistant received the assistant command in a quick and efficient manner, thereby reducing a quantity of occurrences that the user will repeat a spoken utterance that includes the assistant command. As another non-limiting example, the request for content that is responsive to the assistant command can request less information, thereby reducing a size of information transmitted over one or more networks and consuming less network resources.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
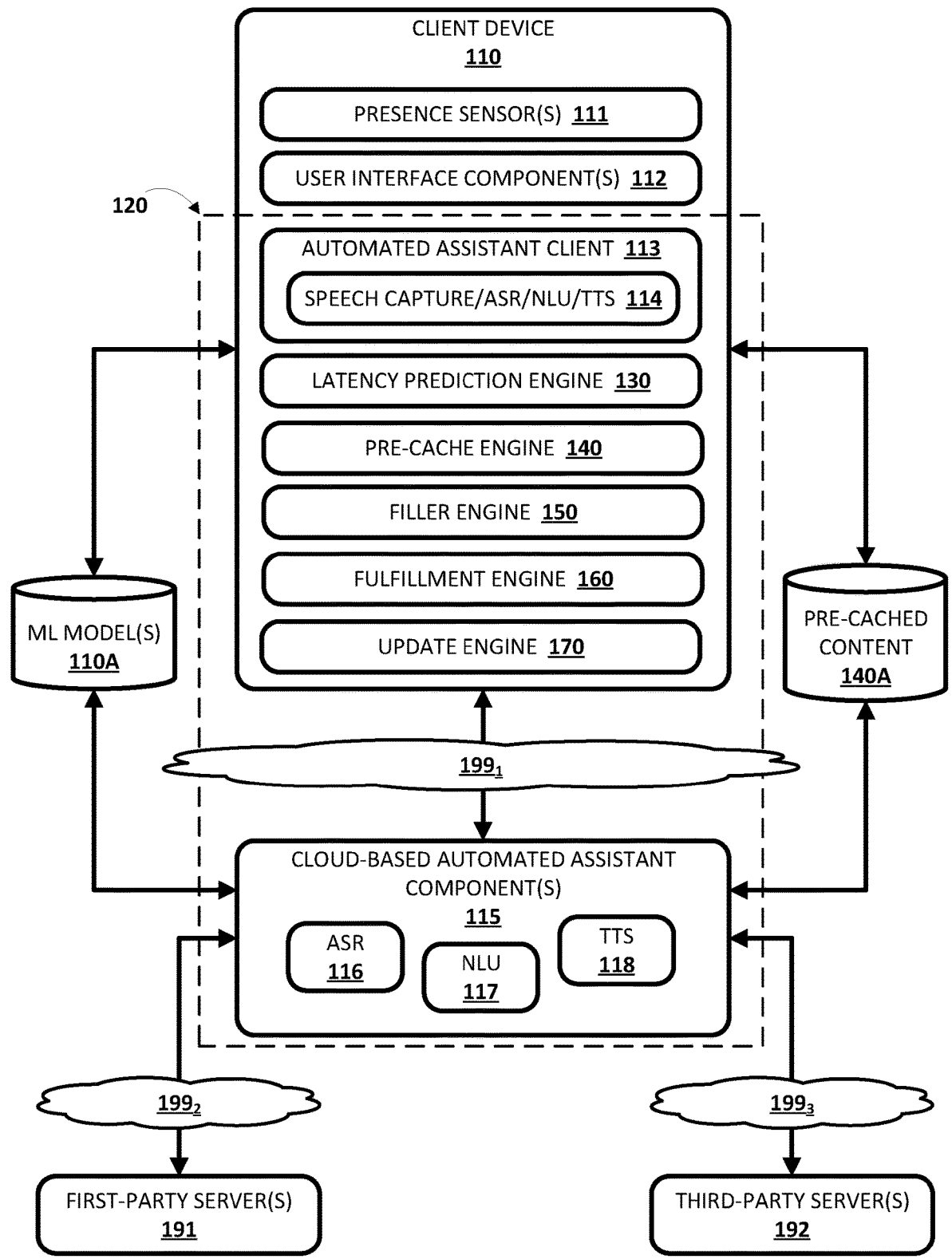
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110, one or more cloud-based automated assistant components 115, one or more first-party servers 191, and one or more third-party servers 192.

The client device 110 can execute an automated assistant client 113. The automated assistant client 113 can be an application that is separate from an operating system of the client device 110 (e.g., installed "on top" of the operating system)—or can alternatively be implemented directly by the operating system of the client device 110. As described further below, the automated assistant client 113 can optionally interact with one or more of the cloud-based automated assistant components 115 in responding to various requests provided by user interface component(s) 112 of the client device 110. Further, and as also described below, other engine(s) of the client device 110 can optionally interact with one or more of the cloud-based automated assistant components 115.

The one or more cloud-based automated assistant components 115 can be implemented on one or more computing systems (e.g., server(s) collectively referred to as a "cloud" or a "remote" computing system) that are communicatively coupled to the client device 110 via one or more local area networks ("LANs," including Wi-Fi LANs, Bluetooth networks, near-field communication networks, mesh networks, etc.), wide area networks ("WANs,", including the Internet, etc.), and/or other networks. The communicative coupling of the cloud-based automated assistant components 115 with the client device 110 is indicated generally by 199$_1$ of FIG. 1. Also, in some implementations, the client device 110 may be communicatively coupled with other client devices (not depicted) via one or more networks (e.g., LANs and/or WANs).

The one or more of cloud-based automated assistant components 115 can also be communicatively coupled with one or more of the first-party servers 191 and/or one or more of the third-party servers via one or more networks (e.g., LANs, WANs, and/or other networks). The communicative coupling of the cloud-based automated assistant components 115 with the one or more of the first-party servers 191 is indicated generally by 199$_2$ of FIG. 1. Further, the communicative coupling of the cloud-based automated assistant components 115 with the one or more of the third-party servers 192 is indicated generally by 199$_3$ of FIG. 1. In some implementations, and although not explicitly depicted in FIG. 1, the client device 110 can additionally or alternatively be communicatively coupled with one or more of the first-party servers 191 and/or one or more of the third-party servers 192 via one or more networks (e.g., LANs, WANs, and/or other networks).

The automated assistant client 113, by way of its interactions with one or more of the cloud-based automated assistant components 115, may form what appears to be, from a user's perspective, a logical instance of an automated assistant 120 with which the user of the client device 110 may engage in a human-to-computer dialog. For example, an instance of the automated assistant 120 encompassed by a dashed line includes the automated assistant client 113 of the client device 110 and one or more cloud-based automated assistant components 115. It thus should be understood that each user that engages with the automated assistant client 113 executing on the client device 110 may, in effect, engage with his or her own logical instance of the automated assistant 120 (or a logical instance of the automated assistant 120 that is shared amongst a household or other group of users and/or shared amongst multiple automated assistant clients 113). Although only the client device 110 is illustrated in FIG. 1, it is understood that one or more of cloud-based automated assistant components 115 can additionally serve many additional groups of client devices. Moreover, although the cloud-based automated assistant components 115 are illustrated in FIG. 1, it is understood that, in various implementations, the automated assistant 120 can be implemented exclusively at the client device 110.

As used herein, a first-party device or system (e.g., the one or more first-party servers 191) references a system that is controlled by a party that is the same as the party that controls the automated assistant 120 referenced herein. For example, the one or more first-party servers 191 can reference a system that hosts a search engine service, a communications service (e.g., email, SMS messaging, etc.), a navigation service, a music service, a document editing or sharing service, and/or other services that are controlled a party that is the same as the party that controls the automated assistant 120 referenced herein. In contrast, a third-party device or system (e.g., the one or more third-party servers 192) references a system that is controlled by a party that is distinct from the party that controls the automated assistant 120 referenced herein. For example, the one or more third-party servers 192 can reference a system that hosts the same services, but those services are controlled by a party that is different from the party that controls the automated assistant 120 referenced herein.

The client device 110 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated assistant 120. Additional and/or alternative client devices may be provided.

In various implementations, the client device 110 may include one or more presence sensors 111 that are configured to provide, with approval from corresponding user(s), signals indicative of detected presence, particularly human presence. In some of those implementations, the automated assistant 120 can identify the client device 110 (or another computing device associated with a user of the client device 110) to satisfy a spoken utterance (or other input directed to the automated assistant 120) based at least in part of presence of the user at the client device 110 (or at another computing device associated with the user of the client device 110). The spoken utterance (or other input directed to the automated assistant 120) can be satisfied by rendering responsive content (e.g., audibly and/or visually) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance (or other input directed to the automated assistant 120). As described herein, the automated assistant 120 can leverage data determined based on the presence sensors 111 in determining the client device 110 (or other computing device(s)) based on where a user is near or was recently near, and provide corresponding commands to only the client device 110 (or those other computing device(s)). In some additional or alternative implementations, the automated assistant 120 can leverage data determined based on the presence sensors 111 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 111 may come in various forms. For example, the client device 110 may be equipped with one or more digital cameras that are configured to capture and provide signal(s) indicative of movement detected in their fields of view. Additionally, or alternatively, the client device 110 may be equipped with other types of light-based presence sensors 111, such as passive infrared ("PIR") sensors that measure infrared ("IR") light radiating from objects within their fields of view. Additionally, or alternatively the client device 110 may be equipped with presence sensors 111 that detect acoustic (or pressure) waves, such as one or more microphones.

Additionally, or alternatively, in some implementations, the presence sensors 111 may be configured to detect other phenomena associated with human presence or device presence. For example, in some embodiments, the client device 110 may be equipped with a presence sensor 111 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform voice recognition to recognize a user from their voice. For example, some instances of the automated assistant 120 may be configured to match a voice to a user's profile, e.g., for purposes of providing/restricting access to various resources. In some implementations, movement of the speaker may then be determined, e.g., by the presence sensors 111 of the client device 110 (and optionally GPS sensors and/or accelerometers). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 120, especially if not much time has passed since the last engagement.

The client device 110 further include user interface component(s) 112, which can include one or more user interface input devices (e.g., microphone(s), touchscreen, keyboard, and/or other input devices) and/or one or more user interface output devices (e.g., display, speaker, projector, and/or other output devices). Further, the client device 110 and/or any other computing device(s) may include one or more memories for storage of data and software applications, one or more processors for accessing data and executing applications, and other components that facilitate communication over a network. The operations performed by the client device 110, other computing device(s), and/or by the automated assistant 120 may be distributed across multiple computer systems. The automated assistant 120 may be implemented as, for example, computer programs running on one or more computers in one or more locations that are coupled to each other through a network (e.g., the network(s) 199 of FIG. 1).

As noted above, in various implementations, the client device 110 may operate the automated assistant client 113. In various embodiments, the automated assistant client 113 may include a speech capture/automatic speech recognition (ASR)/natural language understanding (NLU)/text-to-speech (US) module 114. In other implementations, one or more aspects of the respective speech capture/ASR/NLU/TTS module 114 may be implemented separately from the automated assistant client 113 (e.g., by one or more of the cloud-based automated assistant components 119).

The speech capture/ASR/NLU/TTS module 114 may be configured to perform one or more functions including, for example: capture a user's speech (speech capture, e.g., via respective microphone(s) (which in some cases may comprise one or more of the presence sensors 105)); convert that captured audio to recognized text and/or to other representations or embeddings using ASR model(s) stored in the machine learning (ML) model(s) database 110A; parse and/or annotate the recognized text using NLU model(s) stored in the ML model(s) database 110A; and/or convert text-to-speech using US model(s) stored in the ML model(s) database 110A. Instance(s) of these ML model(s) may be stored locally at the client device 110 and/or accessible by the client device 110 over the network(s) 199 of FIG. 1. In some implementations, because the client device 110 may be relatively constrained in terms of computing resources (e.g., processor cycles, memory, battery, etc.), the respective speech capture/ASR/NLU/TTS module 114 that is local to the client device 110 may be configured to convert a finite number of different spoken phrases to text (or to other forms, such as lower dimensionality embeddings) using the speech recognition model(s). Some speech input may be sent to one or more of the cloud-based automated assistant components 115, which may include a cloud-based ASR module 116, a cloud-based NLU module 117, and/or a cloud-based TTS module 118.

The cloud-based ASR module 116 may be configured to leverage the virtually limitless resources of the cloud to convert audio data captured by the speech capture/ASR/NLU/TTS module 114 into text using ASR model(s) stored in the ML model(s) database 110A, which may then be provided to the cloud-based NLU module 117. The cloud-based TTS module 118 may be configured to leverage the virtually limitless resources of the cloud to convert textual data (e.g., text formulated by automated assistant 120) into computer-generated synthesized speech using speech synthesis model(s) stored in the ML model(s) database 110A. In some implementations, the cloud-based TTS module 118 may provide the computer-generated speech output to the client device 110 and/or other computing device(s) to be output directly, e.g., using speaker(s) of the client device 110 and/or other computing device(s). In other implementations, textual data (e.g., a client device notification included in a command) generated by the automated assistant 120 using the cloud-based TTS module 118 may be provided to speech capture/ASR/NLU/TTS module 114 of the client device 110 and/or other computing device(s), which may then locally convert the textual data into computer-generated speech using the speech synthesis model(s) stored in the ML model(s) database 110A, and cause the computer-generated speech to be rendered via speaker(s) of the client device 110 and/or other computing device(s).

The cloud-based NLU module 117 processes natural language input generated by users via the user interface component(s) 112 of the client device 110 and/or other computing device(s) and may generate annotated output for use by one or more other components of the automated assistant 120. For example, the cloud-based NLU module 117 may process natural language free-form input (e.g., spoken input and/or typed input) that is generated by a user via user interface component(s) 112 of the client device 110. The annotated output generated based on processing the natural language free-form input may include one or more annotations of the natural language input and optionally one or more (e.g., all) of the terms of the natural language input. These annotations can include, for example, intent(s) determined based on processing the natural language input, slot value(s) for parameter(s) associated with determined intent(s), labels corresponding to entities included in the natural language input for entities, parts of speech, and/or other information included in the natural language input, and/or other annotations.

In some implementations, the cloud-based NLU module 117 is configured to identify and annotate various types of grammatical information in natural language input. For example, the cloud-based NLU module 117 may include a part of speech tagger configured to annotate terms with their grammatical roles. In some implementations, the cloud-based NLU module 117 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger of the cloud-based NLU module 117 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the cloud-based NLU module 117 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the cloud-based NLU module 117 may rely on annotations from one or more other components of the cloud-based NLU module 117. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the cloud-based NLU module 117 may use related data outside of the particular natural language input to determine one or more annotations—such as notification rendered by the automated assistant 120 at the client device 110 immediately prior to receiving the natural language input on which the notification is based.

Although particular functionality is described with respect to being performed by one or more of the cloud-based components 115 (e.g., the cloud-based ASR module 115, the cloud-based NLU module 117, and the cloud-based TTS module 118), it should be understood that is for the sake of example and is not meant to be limiting. For example, in various implementations, the speech capture/ASR/NLU/TTS module 114 can perform the same or similar functionality locally at the client device 110 without interacting with the cloud-based automated assistant components 115.

Although FIG. 1 is described with respect to a single client device having a single user, it should be understood that is for the sake of example and is not meant to be limiting. For example, one or more additional client devices of a user can also implement the techniques described herein. These additional client devices may be in communication with the client device 110 (e.g., over the network(s) 199). As another example, a given client device can be utilized by multiple users in a shared setting (e.g., a group of users, a household).

In various implementations, the client device 110 can further include various engines that are utilized in processing various user inputs received at the client device 110 via the user interface component(s) 112. For example, and as depicted in FIG. 1, the client device 110 can further include a latency prediction engine 130, a pre-cache engine 140, a filler engine 150, a fulfillment engine 160, and an update engine 170. The client device 110 can further include on-device memory, including the ML model(s) database 110A and pre-cached content database 140A. In some implementations, these various engines can be executed exclusively on the client device 110. In additional or alternative implementations, one or more of these various engines can be executed remotely from the client device 110 (e.g., as part of the cloud-based automated assistant components 115).

As described herein, the client device 110 can utilize these various engines to reduce latency in responding to user requests and/or to reduce a quantity of user inputs received at the client device 110, thereby conserving computational resources by concluding a human-to-computer dialog session in quicker and more efficient manner and/or reducing a quantity of occurrences that a user repeats the same user request. For example, and turning now to FIG. 2, an example process flows that demonstrate various aspects of the present disclosure is depicted. The process flow depicted in FIG. 2 can be performed by the various engines of the client device 110 depicted in the example environment of FIG. 1.

For example, assume a speech capture engine 114A of the speech capture/ASR/NLU/TSS module 114 detects audio data 114A1 generated by one or more microphones of the client device 110. The audio data can capture a spoken utterance of a user of the client device 110. An ASR engine 114B of the speech capture/ASR/NLU/TSS module 114 can process, using an ASR model stored in the ML model(s) database 110A, the audio data 114A1 to generate ASR output 114B1. The ASR output 114B1 can include, for example, one or more speech hypotheses that are predicted to correspond to the spoken utterance of the user that is captured in the audio data 114A1, one or more corresponding predicted values (e.g., probabilities, log likelihoods, and/or other values) for each of the one or more speech hypotheses, a plurality of phonemes that are predicted to correspond to the spoken utterance of the user that is captured in the audio data 114A1, and/or other ASR output.

In some implementations, the ASR engine 114E3 may only process the audio data 114A1 in response to determining the automated assistant 120 was invoked. The automated assistant 120 can be invoked in response to determining the audio data 114A1 includes one or more particular words or phrases that invoke the automated assistant 120, such as "Assistant", "Hey Assistant", etc. (e.g., determined using a hotword model stored in the ML model(s) database 110A), in response to determining that the audio data 114A1 is received subsequent to an invocation gesture that invokes the automated assistant 120, such as a particular hand movement, eye gaze and/or lip movement directed to the automated assistant 120, etc. detected by one or more vision components of the client device 110 (e.g., determined using a hotword free model stored in the ML model(s) database 110A), in response to determining that the audio data 114A1 is received subsequent to a button press (e.g., hardware or software button) that, when pressed, invokes the automated assistant 120, and/or by any other means. In additional or alternative implementations, the ASR engine 114E3 may continuously process the audio data 114A1 that is generated by one or more of the microphones of the client device 110 (assuming that the user of the client device 110 has consented to the continuous processing of the audio data 114A1).

Further, an NLU engine 114C of the speech capture/ASR/NLU/TSS module 114 can process, using an NLU model of the speech capture/ASR/NLU/TSS module 114, the ASR output 114E31 to generate NLU output 114C1. The NLU output 114C1 can include, for example, one or candidate intents for the spoken utterance of the user, one or more corresponding predicted values (e.g., probabilities, log likelihoods, and/or other values) for each of the one or more candidate intents, one or more slot values for one or more corresponding parameters associated with the one or more candidate intents, and/or other NLU output. Moreover, the automated assistant 120 can determine an assistant command to be performed on behalf of a user of the client device 110 based on the NLU output 114C1. As a working example, assume the user provided a spoken utterance of "Assistant, what is the weather in Louisville?". In this example, the process flow of FIG. 2 can be utilized to determine that the spoken utterance is directed to the automated assistant 120 (e.g., based on determining the spoken utterance includes the term "Assistant"), and can determine the spoken utterance includes a weather intent having a first slot value of [Louisville, KY] for a location parameter associated with the weather intent and a second slot value of [current time] for a time parameter associated with the weather intent. Accordingly, the automated assistant 120 can determine, based on processing the audio data 114A1 that captures the spoken utterance of the user, an assistant command to be performed on behalf of the user of the client device 110.

In some implementations, the latency prediction engine 130 can process, using a latency prediction model, the NLU output 114C1 to generate a predicted latency 130A for the automated assistant 120 to fulfill the assistant command. The automated assistant 120 can fulfill the assistant command by audibly and/or visually rendering content for presentation to the user of the client device 110, by causing the client device 110 to be controlled, by causing another client device of the user to be controlled, and/or by performing other fulfillment. As described herein, the predicted latency 130A can be for example, a predicted duration of time for the automated assistant 120 to generate a fulfillment request, transmit the fulfillment request to the appropriate party (e.g., one or more software applications 110B accessible by the client device 110, one or more of the first-party servers 191, one or more of the third-party servers 192, etc.), and cause the fulfillment to be performed (e.g., audibly and/or visually rendering content for presentation to the user of the client device 110, by causing the client device 110 to be controlled, by causing another client device of the user to be controlled, and/or by performing other fulfillment). For example, the latency prediction engine 130 can process, using the latency prediction model, an intent included in the NLU output 114C1 to generate the predicted latency 130A. In some of those examples, the latency prediction engine 130 can process, using the latency prediction model, and along with the intent included in the NLU output 114C1, one or more slot values for one or more corresponding parameters associated with the intent that are also included in the NLU output 114C1.

In some additional or alternative implementations, the latency prediction engine 130 can process, using the latency prediction model, and along with the NLU output 114C1, the ASR output 114B1 (e.g., as indicated by the dashed line from the ASR output 114B1 to the latency prediction engine 130) to generate the predicted latency 130A for the automated assistant 120 to fulfill the assistant command. In some additional or alternative implementations, the latency prediction engine 130 can process, using the latency prediction model, and along with the NLU output 114C1, one or more device signals 110C generated by the client device. The one or more device signals 110C can include, for example, a location of the client device 110 generated by one or more location sensors of the client device 110, a type of the client device 110 (e.g., a mobile device, an in-vehicle device, a standalone interactive speaker, etc.), a network connection type of the client device 110, and/or other device signals that provide context of an environment of the client device 110.

In various implementations, the latency prediction model can be a ML model trained based on a plurality of training instances (e.g., a classification model, a decision tree, and/or other ML models that are capable of being trained to generate the predicted latency 130A). Each of the training instances can include training instance input and training instance output. The training instance input, for a given training instance of the plurality of training instances can include, for example, NLU data for a given assistant command (e.g., an intent, slot value(s) for parameter(s) associated with the intent, and/or other NLU data), ASR data for the given assistant command (e.g., speech hypothes(es) and/or other ASR data), and/or one or more device signals associated with a client device (e.g., the client device 110 and/or another client device) when the given assistant command was received. Further, the training instance output can include a ground truth latency associated with fulfillment of the given assistant command. In training the latency prediction model based on the given training instance, the training instance input can be processed, using the latency prediction model, to generate a predicted latency associated with fulfillment of the given assistant command. Further, the predicted latency generated based on processing the training instance input can be compared to the ground truth latency associated with fulfillment of the given assistant command to generate one or more losses. The latency prediction model can be updated based on the one or more losses for the given training instance (e.g., by backpropagating the one or more losses across the latency prediction model). The latency prediction model can be trained in this manner until one or more training conditions are satisfied. The training conditions can include, for example, performance of the latency prediction model satisfying a performance threshold, the latency prediction model being trained based on a threshold quantity of training instances, a threshold duration of time of training the latency prediction model, and/or other training conditions. The latency prediction model can be deployed for use by the client device 110 and/or the one or more cloud-based automated assistant components 115 when the one or more training conditions are satisfied.

The pre-cache engine 140 can determine, based on the predicted latency 130A, whether to audibly and/or visually render pre-cached content for presentation to the user of the client device 110 prior to audibly and/or visually rendering content that is responsive to a fulfillment request, prior to an action being performed by the client device 110, and/or prior to an action being performed by another client device of the user. Moreover, and assuming the pre-cache engine 140 determines to audibly and/or visually render the pre-cached content, the pre-cache engine 140 can determine, based on the predicted latency 130A, what pre-cached content to audibly and/or visually render for presentation to the user of the client device 110. The pre-cached content can be stored locally at the client device 110 (e.g., in the pre-cached content database 140A), whereas the content that is responsive to the fulfillment request may be obtained locally at the client device 110 (e.g., via one or more of the software applications 110B) and/or obtained from a remote system (e.g., one or more of the first-party servers 191 and/or the third-party servers 192).

In some implementations, the pre-cached content database 140A can include a plurality of disparate segments of pre-cached content for disparate types of assistant commands. Each of the plurality of disparate segments of pre-cached content for the disparate types of assistant commands can be rendered over different durations of time. In other words, each of the plurality of disparate segments of pre-cached content for the disparate types of assistant commands can be of different lengths and can be selected based on the predicted latency 130A. For example, for weather commands, the pre-cached content database 140A can include a first segment of pre-cached content that takes a first duration of time to be audibly rendered at the client device 110, a second segment of pre-cached content that takes a second duration of time to be audibly rendered at the client device 110 that is longer than the first duration of time, a third segment of pre-cached content that takes a third duration of time to be audibly rendered at the client device 110 that is longer than both the first and second durations of time, and so on. In this example, the first segment of pre-cached content can be selected when the predicted latency 130A fails to satisfy a first latency threshold, the second segment of pre-cached content can be selected when the predicted latency 130A satisfies the first latency threshold but fails to satisfy a second latency threshold, the third segment of pre-cached content can be selected when the predicted latency 130A satisfies the first latency threshold and second latency threshold, and so on.

Other types of assistant commands can be associated with different pre-cached content. For example, for IoT device control commands, the pre-cached content database 140A can include a first, alternate segment of pre-cached content that takes a first duration of time to be audibly rendered at the client device 110 (e.g., that may or may not be the same first duration of time for the weather commands), a second, alternate segment of pre-cached content that takes a second duration of time to be audibly rendered at the client device 110 that is longer than the first duration of time (e.g., that may or may not be the same second duration of time for the weather commands), a third, alternate segment of pre-cached content that takes a third duration of time to be audibly rendered at the client device 110 that is longer than both the first and second durations of time (e.g., that may or may not be the same third duration of time for the weather commands), and so on. In this example, the first, alternate segment of pre-cached content can be selected when the predicted latency 130A fails to satisfy a first latency threshold (e.g., that may or may not be the same first latency threshold for the weather commands), the second, alternate segment of pre-cached content can be selected when the predicted latency 130A satisfies the first latency threshold but fails to satisfy a second latency threshold (e.g., that may or may not be the same second latency threshold for the weather commands), the third segment of pre-cached content can be selected when the predicted latency 130A satisfies the first latency threshold and second latency threshold, and so on.

Continuing with the above working example, further assume that, for the weather command, a first segment of pre-cached content corresponds to "[LOCATION] weather [TIME] is [FULFILLMENT INFORMATION]", a second segment of pre-cached content corresponds to "The weather in beautiful [LOCATION] [TIME] is [FULFILLMENT INFORMATION]", and a third segment of pre-cached content corresponds to "Okay, the radar shows that the weather in [LOCATION] [TIME] is [FULFILLMENT INFORMATION]". In this example, the first pre-cached segment corresponding to "[LOCATION] weather [TIME] is [FULFILLMENT INFORMATION]" can be selected assuming that the predicted latency 130A fails to satisfy a first latency threshold, the second pre-cached segment corresponding to "The weather in beautiful [LOCATION] [TIME] is [FULFILLMENT INFORMATION]" can be selected assuming that the predicted latency 130A satisfies the first latency threshold but not a second latency threshold, and the third pre-cached segment corresponding to "Okay, the radar shows that the weather in [LOCATION] [TIME] is [FULFILLMENT INFORMATION]" can be selected assuming that the predicted latency 130A satisfies both the first latency threshold and the second latency threshold. For the sake of example, assume that the predicted latency 130A satisfies the first latency threshold and the second latency threshold for the received weather command, such that the third pre-cached segment corresponding to "Okay, the radar shows that the weather in [LOCATION] [TIME] is [FULFILLMENT INFORMATION]" is selected as pre-cached content 140A for audible and/or visual presentation to the user of the client device 110.

The filler engine 150 tailor the pre-cached content 140A to the assistant command by filling one or more parameters of the selected pre-cached content 140A with slot values determined based on the spoken utterance and/or inferred based on the spoken utterance. In other words, the filler engine 150 can identify one or more terms in the spoken utterance, and inject those terms into the pre-cached content, such that the selected pre-cached content 140A can be tailored to the assistant command determined based on the spoken utterance. The terms that are injected into the pre-cached content can be based on the assistant command that is included in the spoken utterance. Continuing with the working example, the filler engine 150 can determine that [LOCATION] corresponds to "Louisville", and that [TIME] corresponds to a "current time", resulting in filled pre-cached content 150A of "Okay, the radar shows that the weather in Louisville right now is [FULFILLMENT INFORMATION]".

In some implementations, a TTS engine 114D of the speech capture/ASR/NLU/TSS module 114 can process, using a TTS model stored in the ML model(s) database 110A, the filled pre-cached content 150A to generate synthesized speech audio data that includes synthesized speech 114D1 that corresponds to the filled pre-cached content 150A. The synthesized speech 114D1 that includes the filled pre-cached content 150A can be audibly rendered via one or more speakers of the client device 110 as the filled pre-cached content 150A is generated. In additional or alternative implementations, a transcription engine (not depicted) can cause a transcription corresponding to the filled pre-cached content 150A to be visually rendered via a display of the client device 110 as the filled pre-cached content 150A is generated.

Notably, as the NLU output 114C1 is processed by the various engines described above to generate the filled pre-cached content 150A, the NLU output 114C1 can be processed, in parallel, by the fulfillment engine 160. The fulfillment engine 160A can process the NLU output 114C1 to generate fulfillment data 160A. The fulfillment engine 160A can transmit the fulfillment data 160A to one or more of the software applications 110B that are accessible by the client device 110, one or more of the first-party servers 191, and/or one or more of the third-party servers 192. The fulfillment data 160A generated based on the NLU output 114C1 can include data indicative of the assistant command, such as text corresponding to the assistant command (e.g., generated using the ASR engine 114B), an intent of the assistant command (e.g., determined using the NLU engine 114C), slot value(s) for parameter(s) associated with the intent of the assistant command (e.g., determined using the NLU engine 114C), and/or other data. Continuing with the working example, the automated assistant 120 can cause the fulfillment data 160A to be transmitted to a weather service engine (e.g., executing at one or more of the software applications 1106, the first party servers 191 and/or one or more of the third party servers 192) to obtain content 1606 to be presented to the user responsive to the spoken utterance. The content 1606 can correspond to the [FULFILLMENT INFORMATION] included in the selected pre-cached content 140A of the working example. In various implementations, the fulfillment data 160A can be transmitted along with an indication that the filled pre-cached content 150A is currently being audibly and/or visually rendered for presentation to the user of the client device 110, and that the content 160B can be more concise (e.g., only transmit back the temperature and other weather information without including any [LOCATION] or [TIME] information).

In some implementations, the TTS engine 114D of the speech capture/ASR/NLU/TSS module 114 can process, using the TTS model stored in the ML model(s) database 110A, the content 160A to generate additional synthesized speech audio data that adds on the content 1606 to the synthesized speech 114D1 that is currently being rendered for presentation to the user of the client device 110 via the one or more speakers of the client device 110. Accordingly, by the time an initial portion of the synthesized speech 114D1 that includes the filled pre-cached content 150A (e.g., "Okay, the radar shows that the weather in Louisville right now is . . . ") is audibly rendered for presentation to the user, a subsequent portion of the synthesized speech 114D1 that includes the content 160B (e.g., " . . . 55 degrees and sunny") should be audibly rendered immediately following the initial portion, such that the initial portion of the synthesized speech 114D1 and the subsequent portion of the synthesized speech 114D1 appear, from the user's perspective, as a single instance of synthesized speech from the automated assistant 120. In additional or alternative implementations, a transcription engine (not depicted) can cause a transcription corresponding to the content 160B to be visually rendered via the display of the client device 110 immediately following the transcription of the filled pre-cached content 150A.

In some implementations, the fulfillment engine 160 can determine an actual latency 160B associated with fulfilling the assistant command included in the spoken utterance. The update engine 170 can compare the predicted latency 160A to the actual latency 160B to determine an update 170A for the latency prediction model. The update 170A can be, for example, one or more losses for the latency prediction model that are generated in the same or similar manner described above with respect to generating the one or more losses for training the latency prediction model. The update engine 170 can subsequently cause the latency prediction model to be updated based on the update 170A (e.g., by backpropagating the one or more losses across the latency prediction model).

Figure 2:
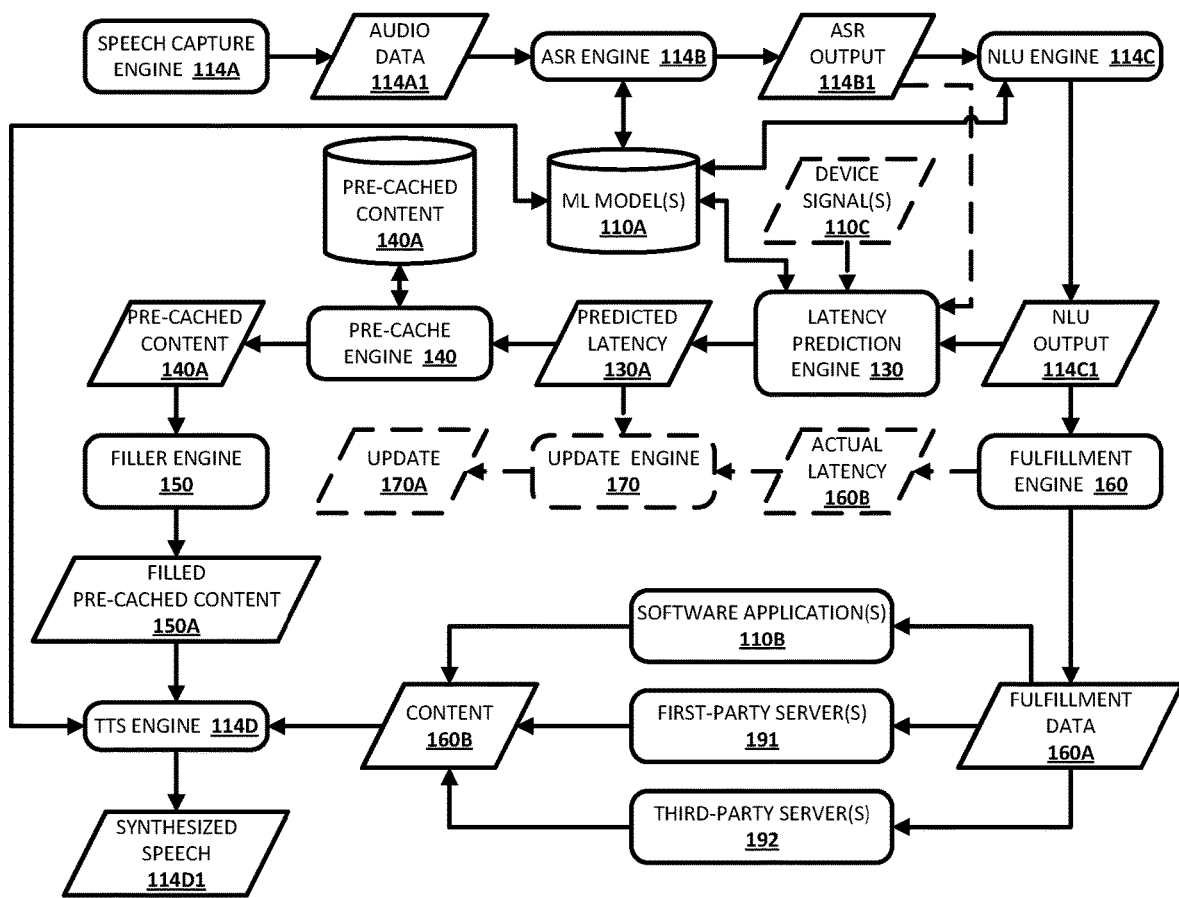
FIG. 2 depicts an example process flows that demonstrate various aspects of the present disclosure, in accordance with various implementations.

Although FIG. 2 is described herein with respect to processing a weather command, it should be understood that is for the sake of example and is not meant to be limiting. For example, the techniques described herein can be utilized to audibly and/or visually render pre-cached content prior to fulfillment of any assistant command based on a predicted latency to fulfill a given assistant command, and including, but not limited to, search query commands directed to public and/or private information, IoT device control commands, assistant routine commands, navigation commands, media commands, software application control commands, and/or any other assistant command directed to the automated assistant.

By using techniques described herein, one or more technical advantages can be achieved. As one non-limiting example, the techniques described herein enable the automated assistant to render pre-cached content that is tailored to an assistant command while obtaining content, thereby concluding human-to-computer dialog between the automated assistant and the user in a quicker and more efficient manner. For instance, the automated assistant can begin responding to an assistant command included in a spoken utterance with the pre-cached content that is tailored to the assistant command, prior to waiting for certain content that is responsive to the spoken utterance to be obtained at the client device. As another non-limiting example, the techniques described herein enable the automated assistant to provide an indication to the user that the automated assistant received the assistant command in a quick and efficient manner, thereby reducing a quantity of occurrences that the user will repeat a spoken utterance that includes the assistant command. As another non-limiting example, the request for content that is responsive to the assistant command can request less information, thereby reducing a size of information transmitted over one or more networks and consuming less network resources.

Figure 3:
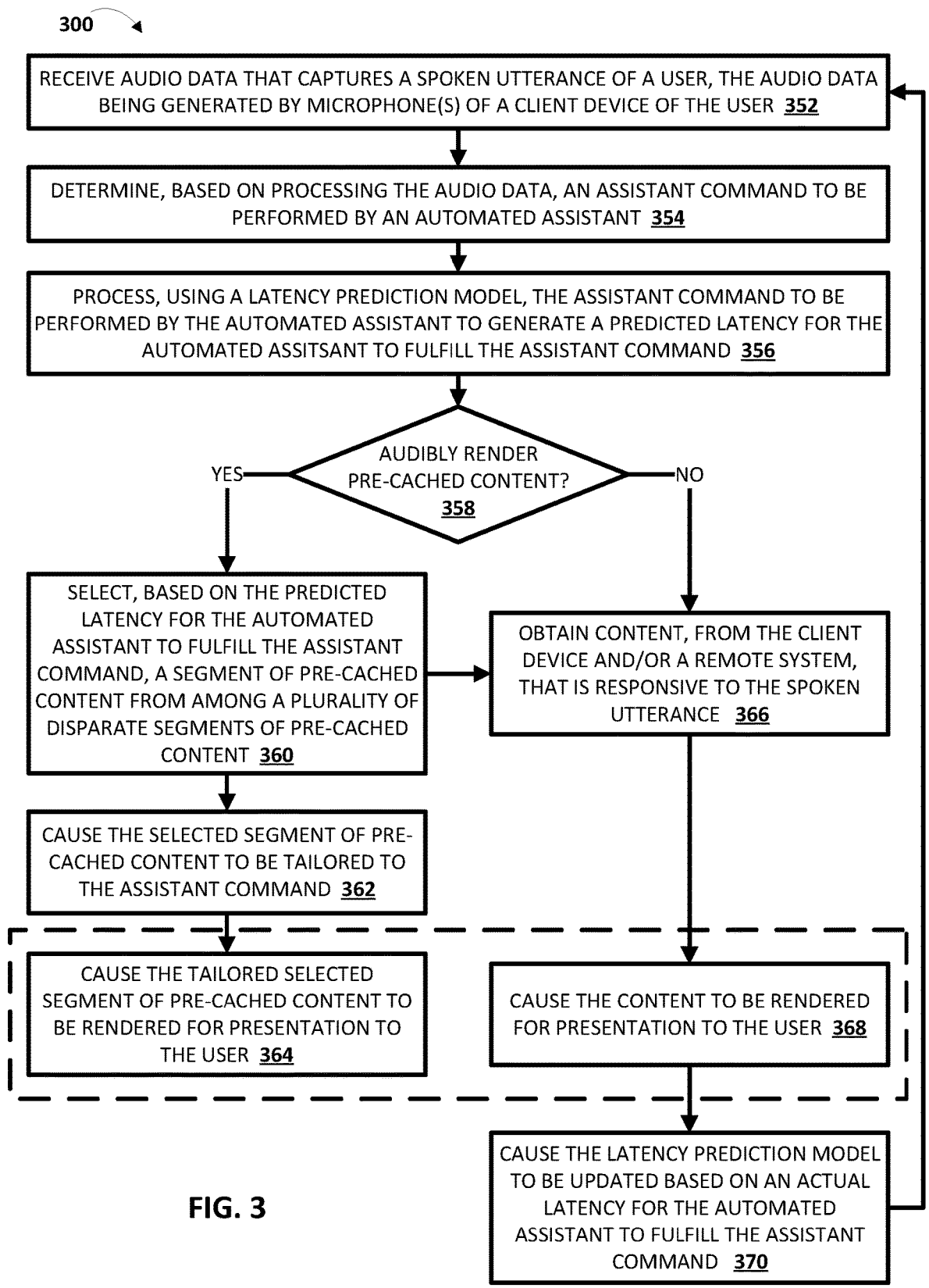
FIG. 3 depicts a flowchart illustrating an example method of determining whether to audibly render pre-cached content for presentation to a user based on a predicted latency for an automated assistant to fulfill an assistant command, in accordance with various implementations.

Turning now to FIG. 3, a flowchart illustrating an example method 300 of determining whether to audibly render pre-cached content for presentation to a user based on a predicted latency for an automated assistant to fulfill an assistant command is depicted. For convenience, the operations of the method 300 are described with reference to a system that performs the operations. This system of the method 300 includes one or more processors, memory, and/or other component(s) of computing device(s) (e.g., client device 110 of FIG. 1, client device 510 of FIGS. 5A, 5B, and 5C, and/or computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system receives audio data that captures a spoken utterance of a user, the audio data being generated by one or more microphones of a client device of the user. At block 354, the system determines, based on processing the audio data, an assistant command to be performed by an automated assistant. For example, the system can process, using an ASR model, the audio data that captures the spoken utterance to generate ASR output, and the system can process, using an NLU model, the ASR output to generate NLU output. The system can determine the assistant command based on the ASR output and/or the NLU output. In some implementations, the system may only process the audio data in response to determining that the audio data was received subsequent to the automated assistant being invoked.

At block 356, the system processes, using a latency prediction model, the assistant command to be performed by the automated assistant to generate a predicted latency for the automated assistant to fulfill the assistant command. The automated assistant can fulfill the assistant command by audibly and/or visually rendering content for presentation to the user of the client device, by causing the client device to be controlled, by causing another client device of the user to be controlled, and/or by performing other fulfillment. The predicted latency can be for example, a predicted duration of time for the automated assistant to generate a fulfillment request, transmit the fulfillment request to the appropriate party (e.g., one or more software applications accessible by the client device, one or more remote systems, etc.), and cause the fulfillment to be performed. For example, the system can process, using the latency prediction model, the ASR output, the NLU output, and/or one or more device signals associated with the client device when the spoken utterance was received to generate the predicted latency.

At block 358, the system determines whether to audibly render pre-cached content for presentation to the user prior to audibly rendering content that is responsive to the spoken utterance. The pre-cached content can be stored locally at the client device of the user. The content that is responsive to the spoken utterance can be obtained from one or more software applications accessible by the client device and/or one or more remote systems (e.g., one or more of the first-party servers 191 or third-party servers 192 of FIG. 1). In some implementations, the system can determine whether to audibly render pre-cached content for presentation to the user prior to audibly rendering the content that is responsive to the spoken utterance based on the predicted latency generated at block 356. For example, the system may determine to audibly render pre-cached content for presentation to the user based on the predicted latency generated at block 356 failing to satisfy one or more latency thresholds and/or based on the predicted latency generated at block 356 satisfying one or more of the latency thresholds. If, at an iteration of block 358, the system determines to audibly render the pre-cached content for presentation to the user prior to audibly rendering the content that is responsive to the spoken utterance, the system may proceed to block 360.

At block 360, the system selects, based on the predicted latency for the automated assistant to fulfill the assistant command, a segment of pre-cached content from among a plurality of disparate segments of pre-cached content. Notably, the plurality of disparate segments of pre-cached content from which the segment of pre-cached content is selected can be specific to the assistant command. In other words, each type of assistant command can be associated with a plurality of corresponding disparate segments of pre-cached content. For example, weather commands can be associated with a first plurality of disparate segments of pre-cached content, IoT device control commands can be associated with a second plurality of disparate segments of pre-cached content, search query commands can be associated with a third plurality of disparate segments of pre-cached content, and so on.

Figure 4:
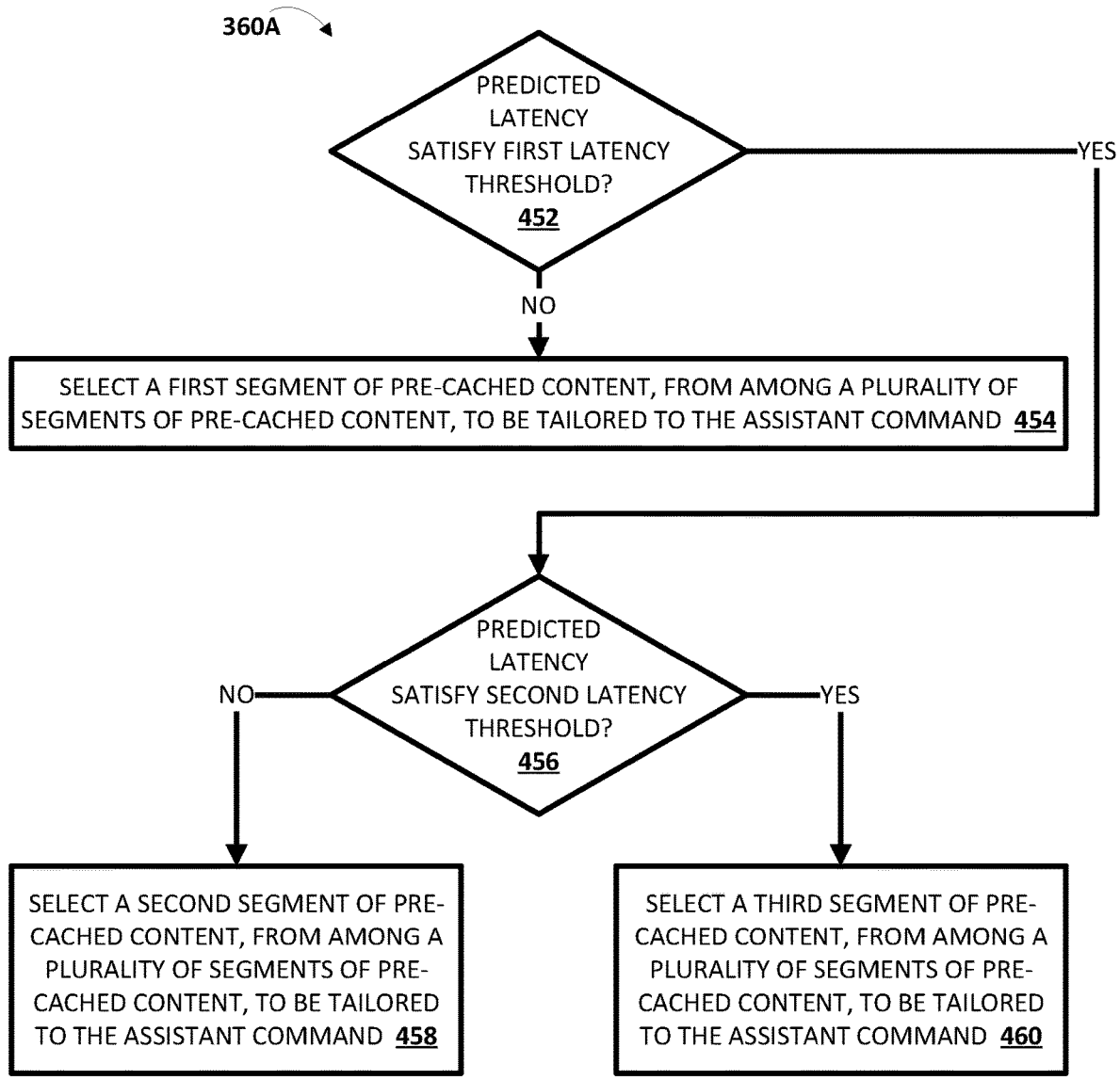
FIG. 4 depicts a flowchart illustrating an example method of selecting pre-cached content to be presented to a user based on a predicted latency for an automated assistant to fulfill an assistant command, in accordance with various implementations.

As one non-limiting example of the operations of block 360, and turning briefly to FIG. 4, an example method 360A of selecting pre-cached content to be presented to a user based on a predicted latency for an automated assistant to fulfill an assistant command is depicted. At block 452, the system determines whether the predicted latency satisfies a first latency threshold. If, at an iteration of block 452, the system determines the predicted latency does not satisfy the first latency threshold, the system proceeds to block 454. At block 454, the system selects a first segment of pre-cached content, from among a plurality of segments of pre-cached content, to be tailored to the assistant command. The first segment of pre-cached content can be of a first length, such that the first segment of pre-cached content takes a first duration of time to audibly and/or visually render for presentation to the user. In some implementations, the first segment of pre-cached content may be a default segment of pre-cached content, such as "Okay, [FULFILLMENT INFORMATION]". If, at an iteration of block 452, the system determines the predicted latency satisfies the first latency threshold, the system proceeds to block 456.

At block 456, the system determines whether the predicted latency satisfies a second latency threshold. If, at an iteration of block 456, the system determines the predicted latency does not satisfy the second latency threshold, the system proceeds to block 458. At block 458, the system selects a second segment of pre-cached content, from among the plurality of segments of pre-cached content, to be tailored to the assistant command. The second segment of pre-cached content can be of a second length, such that the second segment of pre-cached content takes a second duration of time to audibly and/or visually render for presentation to the user. The second length associated with the second segment of pre-cached content can be longer than the first length associated with the first segment of the pre-cached content. As a result, the second duration of time to audibly and/or visually render the second segment of pre-cached content for presentation to the user can be longer than the first duration of time associated with the first segment of pre-cached content. If, at an iteration of block 456, the system determines the predicted latency satisfies the second latency threshold, the system proceeds to block 460.

At block 460, the system selects a third segment of pre-cached content, from among the plurality of segments of pre-cached content, to be tailored to the assistant command. The third segment of pre-cached content can be of a third length, such that the third segment of pre-cached content takes a third duration of time to audibly and/or visually render for presentation to the user. The third length associated with the third segment of pre-cached content can be longer than the first length associated with the first segment of the pre-cached content and the second length associated with the second segment of the pre-cached content. As a result, the third duration of time to audibly and/or visually render the third segment of pre-cached content for presentation to the user can be longer than the first duration of time associated with the first segment of pre-cached content and the second duration of time associated with the second segment of pre-cached content.

Although the method 360A of FIG. 4 is described with respect to particular latency thresholds (e.g., the first latency threshold and the second latency threshold), it should be understood that is for the sake of example and is not meant to be limiting. For example, any quantity of latency thresholds can be utilized in selecting a segment of pre-cached content. Moreover, these latency thresholds can be the same or vary for different assistant commands. For example, a first latency threshold for a weather command may be 500 milliseconds, whereas a first latency threshold for an IoT device control command may be 750 milliseconds. As another example, the first latency threshold for both a weather command and an IoT device control command may both be 500 milliseconds. Accordingly, the system can dynamically select from among the plurality of disparate segments of pre-cached content to tailor to the assistant command based on the predicted latency for the automated assistant to fulfill the assistant command.

Referring back to FIG. 3, at block 362, the system causes the selected segment of pre-cached content to be tailored to the assistant command. The selected segment of the pre-cached content may include one or more parameters that can be filled with slot values that are determined based on the assistant command and/or inferred based on the assistant command (e.g., the parameters of [LOCATION] and [TIME] for the working example described with respect to FIG. 2). The system can inject these slot value(s) into the parameter(s), thereby resulting in a tailored (or filled) selected segment of pre-cached content.

At block 364, the system causes the tailored selected segment of pre-cached content to be rendered for presentation to the user. In some implementations, the tailored selected segment of pre-cached content can be rendered audibly for presentation to the user via one or more speakers of the client device or an additional client device. In these implementations, the tailored selected segment of pre-cached content can be processed, using a TTS model, to generate synthesized speech audio data that includes synthesized speech corresponding to the tailored selected segment of pre-cached content. In additional or alternative implementations, the tailored selected segment of pre-cached content can be rendered visually for presentation to the user via a display of the client device or the additional client device. In these implementations, a transcription corresponding to the tailored selected segment of pre-cached content can be provided for display at the client device (and optionally rendered at the same time in a streaming manner as any synthesized speech that also corresponds to the tailored selected segment of pre-cached content is being audibly rendered).

If, at an iteration of block 358, the system determines not to audibly render the pre-cached content for presentation to the user prior to audibly rendering the content that is responsive to the spoken utterance, the system may proceed to block 366. At block 366, the system obtains content, from the client device and/or a remote system, that is responsive to the spoken utterance. The system can generate a request to obtain the content, and transmit the request to the appropriate channel based on the assistant command (e.g., one or more software applications accessible at the client device, one or more first-party servers, one or more third-party servers, etc.), and receive the content from the appropriate channel. Notably, even when the system determines to audibly render the pre-cached content for presentation to the user prior to audibly rendering the content that is responsive to the spoken utterance, the system may proceed to block 366 from block 360. Accordingly, the system can select and render the tailored selected segment of pre-cached content for presentation to the user as the system obtains the content that is responsive to the spoken utterance.

At block 368, the system causes the content to be rendered for presentation to the user. In some implementations, the content can be rendered audibly for presentation to the user via one or more of the speakers of the client device or the additional client device. In these implementations, the content can be processed, using a TTS model, to generate additional synthesized speech audio data that includes synthesized speech corresponding to the content. In additional or alternative implementations, the content can be rendered visually for presentation to the user via a display of the client device or the additional client device. In these implementations, a transcription corresponding to the tailored selected segment of pre-cached content can be provided for display at the client device (and optionally rendered at the same time in a streaming manner as any synthesized speech that also corresponds to the tailored selected segment of pre-cached content is being audibly rendered).

Notably, the tailored selected segment of pre-cached content rendered for presentation to the user at block 364 and the content rendered for presentation to the user at block 368 can rendered such that it appears, from the user's perspective, as a single instance of content (e.g., as indicated by the dashed box). For example, by selecting the segment of pre-cached content to be tailored to the assistant command based on the predicted latency, the system should obtain the content from the appropriate channel by the time the tailored segment of pre-cached content has finished being rendered for presentation to the user, such that the content can be added on to the synthesized speech and/or the transcription in a manner that it appears the pre-cached tailored segment of the pre-cached content and the content are, in fact, a single segment of content.

In some implementations, the system may cause the tailored selected segment of pre-cached content to be rendered for presentation to the user in response to determining that the user has completed the spoken utterance. The system can determine the user has completed the spoken utterance using, for example, an end pointing model that is trained to determine when a user has completed providing spoken utterances. In some versions of these implementations, if the content is obtained at block 366 prior to initiating rendering of the tailored selected segment of pre-cached content, then the tailored selected segment of pre-cached content may be discarded, and the content can be rendered to reduce a length of the human-to-computer dialog.

At block 370, the system causes the latency prediction model to be updated based on an actual latency for the automated assistant to fulfill the assistant command. For example, assume the predicted latency for the automated assistant to fulfill the assistant command was 900 milliseconds, but the actual latency for the automated assistant to fulfill the assistant command was only 500 milliseconds. In this example, the predicted latency can be compared to the actual latency to generate one or more losses and the latency prediction model can be updated based on the one or more losses. Notably, in this example, the content may be obtained prior to the tailored selected segment of pre-cached content being fully rendered for presentation to the user. In some implementations, the rendering of the tailored selected segment of pre-cached content may be interrupted to render the content, whereas in other implementations, the rendering of the tailored selected segment of pre-cached content may not be interrupted to render the content. As another example, assume the predicted latency for the automated assistant to fulfill the assistant command was only 500 milliseconds, but the actual latency for the automated assistant to fulfill the assistant command was 900 milliseconds. In this example, the predicted latency can be compared to the actual latency to generate one or more losses and the latency prediction model can be updated based on the one or more losses. Notably, in this example, the content may be obtained after the tailored selected segment of pre-cached content was already fully rendered for presentation to the user. In some implementations, an additional tailored selected segment of pre-cached content can be generated in the same or similar manner described herein to fill any unwanted gaps in rendering of content, whereas in other implementations, the rendering of the content may be presented when it is received without generating the additional tailored selected segment of pre-cached content. The system may return to block 352 to perform a subsequent iteration of the method 300 upon receiving additional audio data that captures an additional spoken utterance of the user.

Although the method 300 of FIG. 3 is described with respect to rendering content that is responsive to the spoken utterance, it should be understood that is for the sake of example and is not meant to be limiting. For example, assume the user provides a spoken utterance to launch a restaurant reservation application to a particular state, such as a restaurant reservation page for a fictitious restaurant named Hypothetical Café. In this example, the tailored selected segment can be, for example, "Okay, launching the restaurant reservation application to Hypothetical Café", and the content to be rendered for presentation to the user can be the loaded restaurant reservation page. As another example, assume the user provides a spoken utterance to preheat a smart oven to a particular temperature, such as 375 degrees Fahrenheit. In this example, the tailored selected segment can be, for example, "Preheating the oven to 375 degrees Fahrenheit for you", and the content to be rendered for presentation to the user can be an audible indication at the smart oven that it has begun preheating to the desired temperature.

Figure 5A:
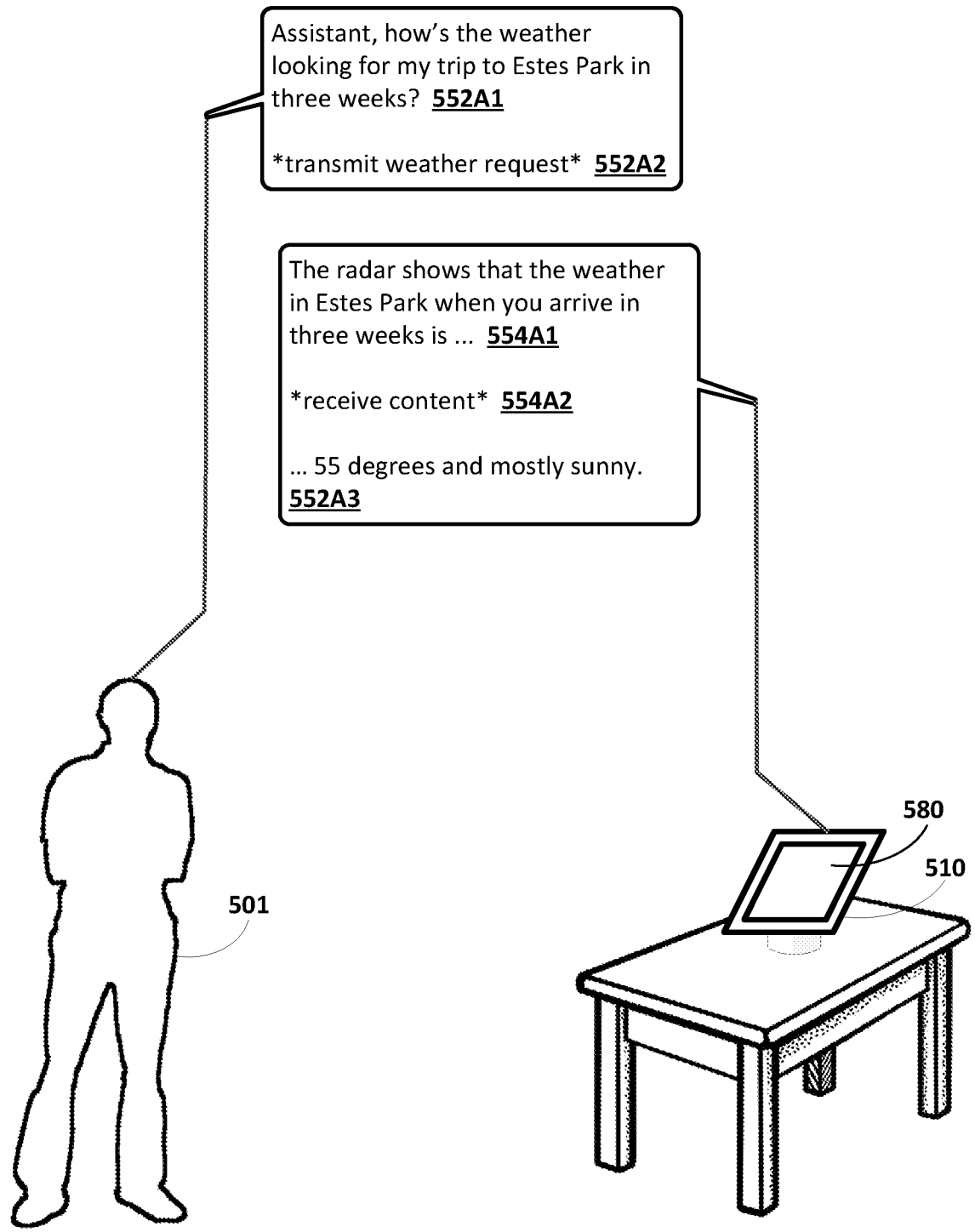
FIG. 5A, FIG. 5B, and FIG. 5C depict various non-limiting examples of a client device audibly rendering pre-cached content for presentation to a user based on a predicted latency for an automated assistant to fulfill various assistant commands, in accordance with various implementations.
Figure 5B:
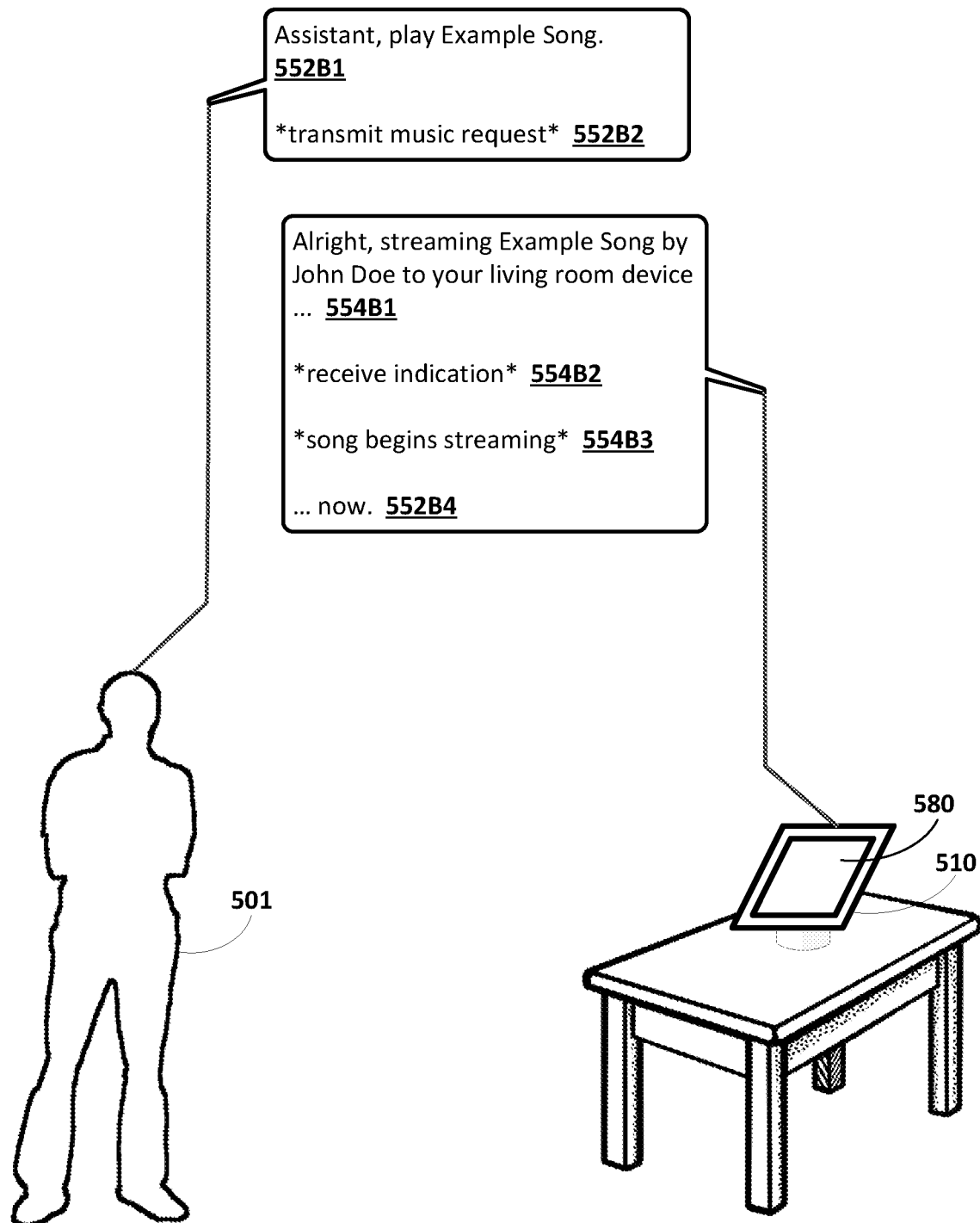
Figure 5C:
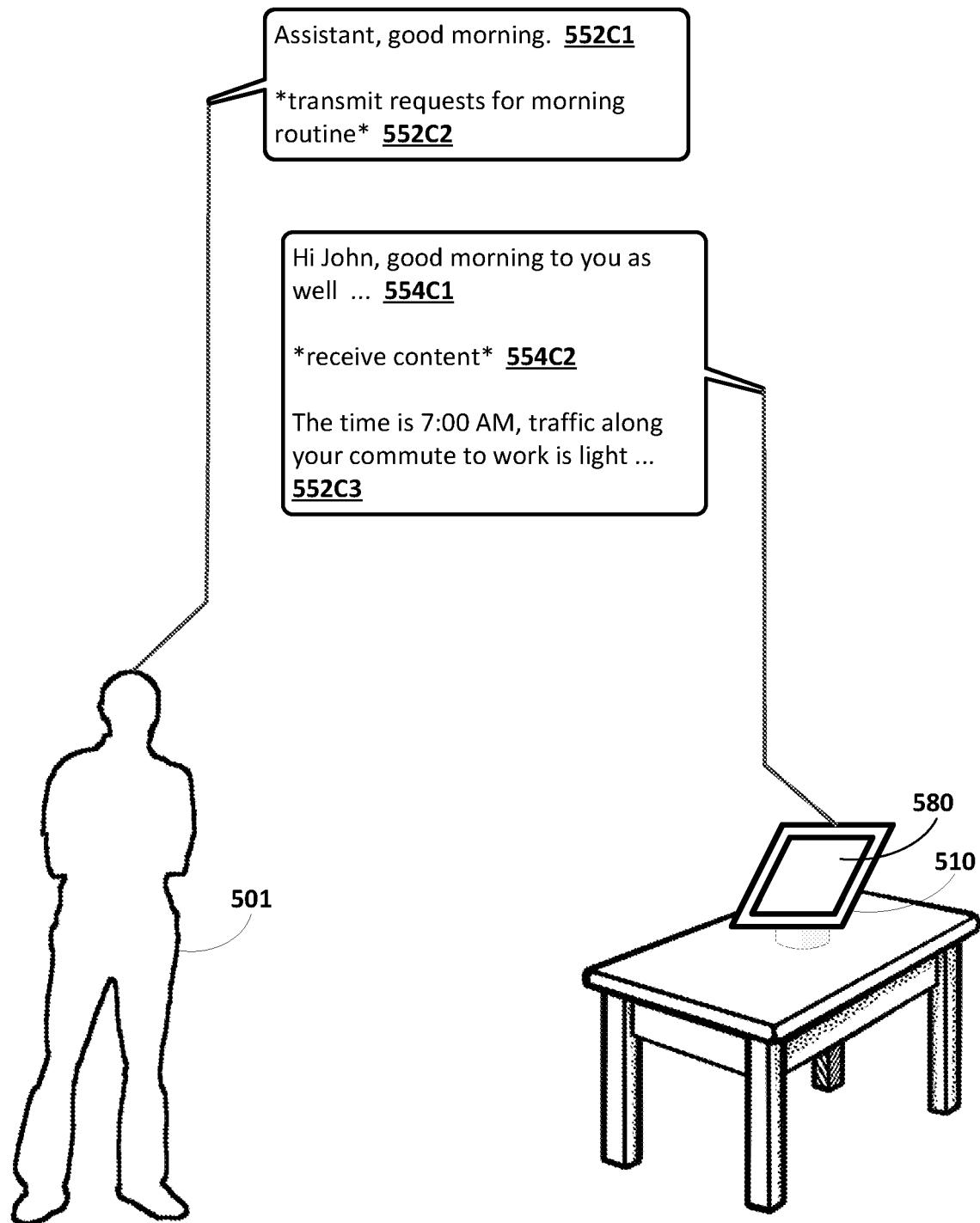

Turning now to FIGS. 5A, 5B, and 5C, various non-limiting examples of a client device 510 audibly rendering pre-cached content for presentation to a user 501 based on a predicted latency for an automated assistant to fulfill various assistant commands are depicted. The client device 510 may include microphone(s) to generate audio data based on spoken utterances and/or other audible input, speaker(s) to audibly render synthesized speech and/or other audible output, and/or a display 580 to visually render transcriptions and/or other visual output. Although the client device 510 depicted in FIGS. 5A, 5B, and 5C is a standalone client device having a display, it should be understood that is for the sake of example and is not meant to be limiting. For example, the client device 510 may be a mobile device, a standalone speaker without a display, a home automation device, an in-vehicle system, a laptop, a desktop computer, and/or any other device capable of executing the automated assistant to engage in a human-to-computer dialog session with the user 501.

Referring specifically to FIG. 5A, assume the user 501 provides a spoken utterance 552A1 of "Assistant, how's the weather looking for my trip to Estes Park in three weeks?". In this example, the automated assistant can cause audio data capturing the spoken utterance 552A1 to be processed, using an ASR model, to generate ASR output. Further, the automated assistant can cause the ASR output to be processed, using an NLU model, to generate NLU output. Moreover, the automated assistant can cause the NLU output to be processed to generate fulfillment data. The automated assistant can generate, based on the fulfillment data, a request for content that is responsive to the spoken utterance. In this example, the request may be a weather request associated with a [LOCATION] parameter having a value of Estes Park, CO, and a [TIME] parameter having a value of three weeks. The request can be transmitted to an appropriate channel as indicated by 552A2. In the example of FIG. 5A, the appropriate channel is likely a weather service hosted by a remote system (e.g., one or more of the third-party servers 192 of FIG. 1).

While waiting for content to be received at the client device 510 that is responsive to the request, the automated assistant can, in parallel, determine a predicted latency associated with a predicted duration of time for the automated assistant to fulfill the weather command, and can determine, based on the predicted latency, whether to cause pre-cached content to rendered for presentation to the user 501. For example, the automated assistant can cause the ASR output generated based on the spoken utterance 552A1, the NLU output generated based on the spoken utterance 552A1, and/or device signal(s) associated with the client device 510 to be processed, using a latency prediction model, to determine the predicted latency. The automated assistant can select a given segment of pre-cached content, from among a plurality of disparate segments of pre-cached content associated with the weather command, based on the predicted latency. Further, the automated assistant can cause the selected given segment of pre-cached content to be tailored to the spoken utterance 552A1.

In the example of FIG. 5A, assume that the automated assistant determines, based on the predicted latency, to cause pre-cached content to be rendered for presentation to the user 501. Further assume the automated assistant selects, based on comparing the predicted latency to one or more latency thresholds, a segment of pre-cached content of "The radar shows that the weather in [LOCATION] [TIME] is [FULFILLMENT INFORMATION]". Further assume the automated assistant fills parameters of the selected segment of pre-cached content (e.g., [LOCATION] and [TIME]) with information determined based on the spoken utterance 552A1, resulting in the tailored segment of pre-cached content of "The radar shows that the weather in Estes Park when you arrive in three weeks is . . . ". The automated assistant can cause the tailored segment of pre-cached content to be processed, using a TTS model, to generate synthesized speech audio data that includes synthesized speech 554A1 corresponding to the tailored segment of pre-cached content, and cause the synthesized speech 554A1 to be rendered for audible presentation to the user 501 via the speaker(s) of the client device 510. Additionally, or alternatively, the automated assistant can stream a transcription corresponding to the tailored segment of pre-cached content on the display 580 of the client device 510.

Moreover, assume that content responsive to the spoken utterance 552A1 is received while the synthesized speech 554A1 is being rendered for presentation to the user 501 as indicated by 554A2. Although the indication 554A2 of the content that is responsive to the spoken utterance 552A1 is depicted as being received after rendering of the synthesized speech 554A1, it should be understood that is for the sake of clarity. When the content that is responsive to the spoken utterance 552A1 is received at the client device 510, the automated assistant can cause the content to be processed, using the TTS model, to generate additional synthesized speech audio data that includes synthesized speech 554A3 of "55 degrees and sunny" corresponding to the content, and cause the synthesized speech 554A3 to be rendered for audible presentation to the user 501 via the speaker(s) of the client device 510. Additionally, or alternatively, the automated assistant can stream the transcription corresponding to the content on the display 580 of the client device 510.

Notably, the rendering of the synthesized speech 554A1 and the rendering of the synthesized speech 552A3 can be synced such that it appears, from the perspective of the user 501, the synthesized speech 554A1 and the synthesized speech 552A3 are a single, continuous stream from the automated assistant (e.g., "The radar shows that the weather in Estes Park when you arrive in three weeks is 55 degrees and sunny") even though the automated assistant may not have received the content (e.g., "55 degrees and sunny") until the synthesized speech 554A1 was already being rendered. Accordingly, the automated assistant need not have already obtained the content when the synthesized speech 554A1 is audibly rendered for presentation to the user. As a result, the human-to-computer dialog session between the user 501 and the automated assistant can be concluded in a quicker and more efficient manner.

Although the example of FIG. 5A is described with respect to obtaining content from an appropriate channel, and causing the content to be rendered for presentation to the user 501, it should be understood that is for the sake of example and is not meant to be limiting. Referring specifically to FIG. 5B, the techniques described herein can be utilized in controlling software applications and/or other devices. For example, assume the user 501 provides a spoken utterance 552B1 of "Assistant, play Example Song", where "Example Song" is a fictitious song by a fictitious artist John Doe. In this example, the automated assistant can cause audio data capturing the spoken utterance 552B1 to be processed, using an ASR model, to generate ASR output. Further, the automated assistant can cause the ASR output to be processed, using an NLU model, to generate NLU output. Moreover, the automated assistant can cause the NLU output to be processed to generate fulfillment data. The automated assistant can generate, based on the fulfillment data, a request for content that is responsive to the spoken utterance. In this example, the request may be a music request associated with a [SONG] parameter having a value of Example Song, and an [ARTIST] parameter having a value of John Doe. The request can be transmitted to an appropriate channel as indicated by 552B2. In the example of FIG. 5B, the appropriate channel can be a music application accessible by the client device 510, or a music streaming service hosted by a remote system (e.g., one or more of the first-party servers 191 and/or third-party servers 192 of FIG. 1).

While waiting for the song to begin playing responsive to the request, the automated assistant can, in parallel, determine a predicted latency associated with a predicted duration of time for the automated assistant to fulfill the music command, and can determine, based on the predicted latency, whether to cause pre-cached content to rendered for presentation to the user 501. For example, the automated assistant can cause the ASR output generated based on the spoken utterance 552B1, the NLU output generated based on the spoken utterance 552B1, and/or device signal(s) associated with the client device 510 to be processed, using a latency prediction model, to determine the predicted latency. The automated assistant can select a given segment of pre-cached content, from among a plurality of disparate segments of pre-cached content associated with the music command, based on the predicted latency. Further, the automated assistant can cause the selected given segment of pre-cached content to be tailored to the spoken utterance 552B1.

In the example of FIG. 5B, assume that the automated assistant determines, based on the predicted latency, to cause pre-cached content to be rendered for presentation to the user 501. Further assume the automated assistant selects, based on comparing the predicted latency to one or more latency thresholds, a segment of pre-cached content of "Alright, streaming [SONG] by [ARTIST] to [DEVICE]". Further assume the automated assistant fills parameters of the selected segment of pre-cached content (e.g., [SONG], [ARTIST], and [DEVICE]) with information determined based on the spoken utterance 552A1, resulting in the tailored segment of pre-cached content of "Alright, streaming Example Song by John Doe to your living room device". In this example, the automated assistant can determine to play the song at the living room device based on one or more criteria, such as capabilities of the living room device (e.g., a type of speaker(s) of the living room device), presence of the user 501 in the living room, and/or other criteria (e.g., described with respect to the presence sensor(s) 111 of FIG. 1). The automated assistant can cause the tailored segment of pre-cached content to be processed, using a TTS model, to generate synthesized speech audio data that includes synthesized speech 554B1 corresponding to the tailored segment of pre-cached content, and cause the synthesized speech 554B1 to be rendered for audible presentation to the user 501 via the speaker(s) of the client device 510. Additionally, or alternatively, the automated assistant can stream a transcription corresponding to the tailored segment of pre-cached content on the display 580 of the client device 510.

Moreover, assume that the client device 510 receives an indication that the music is ready to be played at the living room device while the synthesized speech 554B1 is being rendered for presentation to the user 501 as indicated by 554B2, and that the song begins streaming as indicated by 554B3 (where the indications 554B2 and 554B3 may be received as part of a single transmission to the client device 510 or separate transmissions). Although the indications 554B2 and 554B3 are depicted as being received after rendering of the synthesized speech 554B1, it should be understood that is for the sake of clarity. In some implementations, when these indications 554B2 and 554B3 are received at the client device 510, the automated assistant can cause additional content to be processed, using the TTS model, to generate additional synthesized speech audio data that includes synthesized speech 554A4 of "now" corresponding to the additional content, and cause the synthesized speech 554A4 to be rendered for audible presentation to the user 501 via the speaker(s) of the client device 510. Additionally, or alternatively, the automated assistant can stream the transcription corresponding to the additional content on the display 580 of the client device 510. In additional or alternative implementations, the automated assistant may not cause any additional content to be rendered for presentation to the user 501.

Notably, the rendering of the synthesized speech 554B1 can be provided even though the automated assistant may not have received any indication that Example Song will be streamed. Nonetheless, the automated assistant can still cause the synthesized speech 554B1 to be rendered for presentation to the user 501 in anticipation that the song will be streamed at one or more devices associated with the user 501. As a result, a quantity of occurrences that the user 501 will repeat the spoken utterance 552B1 while the automated assistant fulfills an assistant command (e.g., the music command in the example of FIG. 5B) during the human-to-computer dialog session between the user 501 and the automated assistant is reduced, thereby conserving computational resources at the client device 510.

Although the examples of FIGS. 5A and 5B are described with respect to the automated assistant performing a single action (e.g., obtaining the weather content in FIG. 5A, and playing a song in FIG. 5B), it should be understood that is for the sake of example and is not meant to be limiting. Referring specifically to FIG. 5c, the techniques described herein can be utilized in executing assistant routines that include multiple assistant commands. For example, assume the user 501 provides a spoken utterance 552C1 of "Assistant, good morning", where "good morning" invokes an assistant routine that includes a time command, a traffic command, a weather command, a news command, and/or other assistant commands. In this example, the automated assistant can cause audio data capturing the spoken utterance 552C1 to be processed, using an ASR model, to generate ASR output. Further, the automated assistant can cause the ASR output to be processed, using an NLU model, to generate NLU output. Moreover, the automated assistant can cause the NLU output to be processed to generate fulfillment data. The automated assistant can generate, based on the fulfillment data, multiple requests for content that is responsive to the spoken utterance. In this example, the request may be a time request associated with a [TIME] parameter having a value of current time, a traffic request associated with a [ROUTE] parameter having a value of a work route, a weather command associated with a [LOCATION] parameter having a value of Louisville, KY (assuming the user 501 is located in Louisville, KY) and a [TIME] parameter having a value of current time, and/or other requests. The multiple requests can be transmitted to corresponding appropriate channels as indicated by 552C2. In the example of FIG. 5C, the corresponding appropriate channel for the time request may be a clock application of the client device 510, the corresponding appropriate channel for the traffic request may be a navigation application of the client device 510, the corresponding appropriate channel for the weather request is likely a weather service hosted by a remote system (e.g., one or more of the third-party servers of FIG. 1), and/or other corresponding appropriate channels based on the assistant commands for the good morning routine.

While waiting for content to be received at the client device 510 that is responsive to one or more of the multiple requests, the automated assistant can, in parallel, determine a predicted latency associated with a predicted duration of time for the automated assistant to fulfill the one or more of the assistant commands of the good morning routing, and can determine, based on the predicted latency, whether to cause pre-cached content to rendered for presentation to the user 501. For example, the automated assistant can cause the ASR output generated based on the spoken utterance 552C1, the NLU output generated based on the spoken utterance 552C1, and/or device signal(s) associated with the client device 510 to be processed, using a latency prediction model, to determine the predicted latency. The automated assistant can select a given segment of pre-cached content, from among a plurality of disparate segments of pre-cached content associated with the weather command, based on the predicted latency. Further, the automated assistant can cause the selected given segment of pre-cached content to be tailored to the spoken utterance 552C1. In implementations where there are multiple requests (e.g., an assistant routine), the automated assistant can determine a predicted latency for each of the assistant commands included in the routine and/or a subset of the assistant commands included in the routine. For example, the automated assistant may only consider the predicted latency associated with the time command since content responsive to the time command is rendered first, and the automated assistant can obtain additional content responsive to the other assistant commands included in the routine while rendering the content associated with the time request. As another example, the automated assistant may only consider the longest predicted latency associated with one or more of the assistant commands included in the routine.

In the example of FIG. 5C, assume that the automated assistant determines, based on the predicted latency, to cause pre-cached content to be rendered for presentation to the user 501. Further assume the automated assistant selects, based on comparing the predicted latency to one or more latency thresholds, a segment of pre-cached content of "Hi [NAME], good morning to you as well . . . ". Further assume the automated assistant fills parameters of the selected segment of pre-cached content (e.g., [NAME]) with information, resulting in the tailored segment of pre-cached content of "Hi John, good morning to you as well . . . ". The automated assistant can cause the tailored segment of pre-cached content to be processed, using a TTS model, to generate synthesized speech audio data that includes synthesized speech 554C1 corresponding to the tailored segment of pre-cached content, and cause the synthesized speech 554C1 to be rendered for audible presentation to the user 501 via the speaker(s) of the client device 510. Additionally, or alternatively, the automated assistant can stream a transcription corresponding to the tailored segment of pre-cached content on the display 580 of the client device 510.

Moreover, assume that content responsive to the spoken utterance 552C1 is received while the synthesized speech 554X1 is being rendered for presentation to the user 501 as indicated by 554C2. Although the indication 554C2 of the content that is responsive to the spoken utterance 552C1 is depicted as being received after rendering of the synthesized speech 554C1, it should be understood that is for the sake of clarity. When the content that is responsive to the spoken utterance 552C1 is received at the client device 510, the automated assistant can cause the content to be processed, using the TTS model, to generate additional synthesized speech audio data that includes synthesized speech 554C3 of "The time is 7:00 AM, traffic along your commute to work is light . . . " corresponding to the content, and cause the synthesized speech 554C3 to be rendered for audible presentation to the user 501 via the speaker(s) of the client device 510. Additionally, or alternatively, the automated assistant can stream the transcription corresponding to the content on the display 580 of the client device 510.

Notably, the rendering of the synthesized speech 554C1 and the rendering of the synthesized speech 552C3 can be synced such that it appears, from the perspective of the user 501, the synthesized speech 554C1 and the synthesized speech 552C3 are a single, continuous stream from the automated assistant (e.g., "Hi John, good morning to you as well. The time is 7:00 AM, traffic along your commute to work is light . . . ") even though the automated assistant may not have received the content (e.g., "The time is 7:00 AM, traffic along your commute to work is light . . . ") until the synthesized speech 554C1 was already being rendered. Accordingly, the automated assistant need not have already obtained the content when the synthesized speech 554C1 is audibly rendered for presentation to the user. As a result, the human-to-computer dialog session between the user 501 and the automated assistant can be concluded in a quicker and more efficient manner, even when the automated assistant performs multiple assistant commands.

Figure 6:
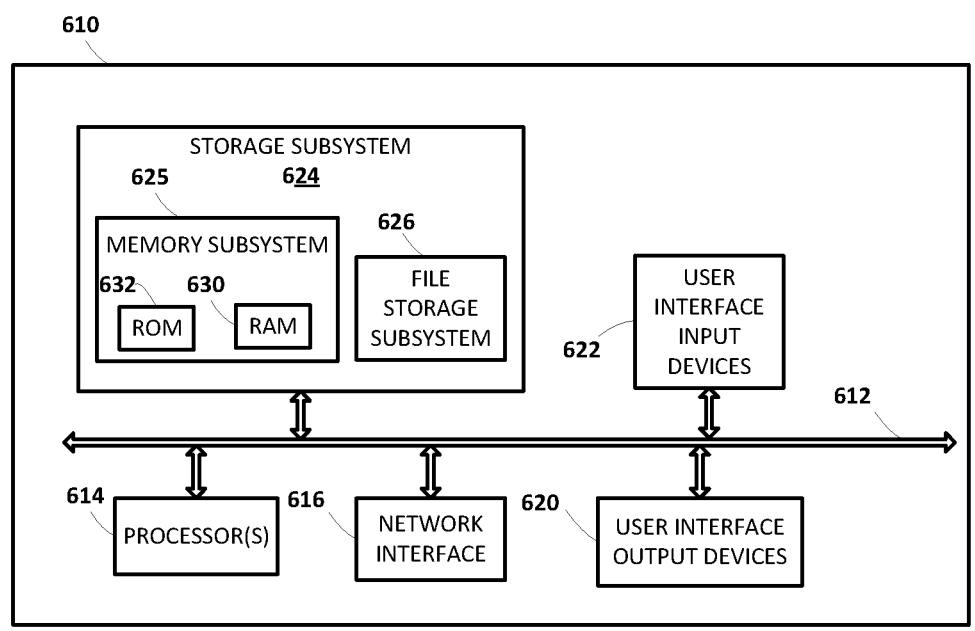
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving audio data that captures a spoken utterance of a user, the audio data being generated one or more microphones of a client device of the user; determining, based on processing the audio data that captures the spoken utterance of the user, an assistant command to be performed by an automated assistant; processing, using a latency prediction model, the assistant command to be performed by the automated assistant to generate a predicted latency for the automated assistant to fulfill the assistant command; determining, based on the predicted latency for the automated assistant to fulfill the assistant command, whether to audibly render pre-cached content for presentation to the user prior to audibly rendering remote content for presentation to the user, the pre-cached content being stored locally at the client device, and the remote content being generated by a remote system responsive to the spoken utterance; and in response to determining to audibly render the pre-cached content for presentation to the user prior to audibly rendering the remote content: causing the pre-cached content to be tailored to the assistant command; and causing the pre-cached to be audibly rendered for presentation to the user via one or more speakers of the client device.

These and other implementations of technology disclosed herein can optionally include one or more of the following features.

In some implementations, determining the assistant command to be performed by the automated assistant can include processing, using an automatic speech recognition (ASR) model, the audio data that captures the spoken utterance of the user to generate ASR output; processing, using a natural language understanding (NLU) model, the ASR output to generate NLU output; and determining the assistant command to be performed by the automated assistant based on the NLU output.

In some versions of those implementations, processing the assistant command using the latency prediction model to generate the latency prediction output can include processing, using the latency prediction model, the NLU output to generate the predicted latency for the automated assistant to fulfill the assistant command. In some further versions of those implementations, processing the assistant command using the latency prediction model to generate the latency prediction output further can include processing, using the latency prediction model, and along with the NLU output, one or more client device signals to generate the predicted latency for the automated assistant to fulfill the assistant command. the one or more client device signals can include one or more of: a location of the client device of the user, a type of the client device of the user, or a network connection type of the client device of the user.

In some versions of those implementations, the NLU output can include an intent of the user. In some further versions of those implementations, the NLU output can further include one or more slot values for one or more corresponding parameters associated with the intent of the user.

In some implementations, the method can further include obtaining the pre-cached content. Obtaining the pre-cached content can include selecting, based on the predicted latency for the automated assistant to fulfill the assistant command, and based on the assistant command, the pre-cached content to be tailored to the assistant command from among a plurality of disparate segments of pre-cached content.

In some versions of those implementations, the method can further include, in response to determining the predicted latency for the automated assistant to fulfill the assistant command fails to satisfy a first latency threshold and a second latency threshold: selecting a first segment of the pre-cached content, from among the plurality of disparate segments of pre-cached content, to be tailored to the assistant command. The first segment of the pre-cached content can be audibly rendered for presentation to the user over a first duration of time. In some further versions of those implementations, the method can further include, in response to determining the predicted latency for the automated assistant to fulfill the assistant command satisfies the first latency threshold, but fails to satisfy the second latency threshold: selecting a second segment of the pre-cached content, from among the plurality of disparate segments of pre-cached content, to be tailored to the assistant command. The second segment of the pre-cached content can be audibly rendered for presentation to the user over a second duration of time, and the second duration of time can differ from the first duration of time. In yet further versions of those implementations, the method can further include, in response to determining the predicted latency for the automated assistant to fulfill the assistant command satisfies the first latency threshold and the second latency threshold: selecting a third segment of the pre-cached content, from among the plurality of disparate segments of pre-cached content, to be tailored to the assistant command. The third segment of the pre-cached content can be audibly rendered for presentation to the user over a third duration of time, and the third duration of time can differ from both the first duration of time and the second duration of time.

In some implementations, the method can further include obtaining the remote content from the remote system. Obtaining the remote content from the remote system can include generating a request for the remote content based on the assistant command; transmitting, from the client device and over one or more networks, the request for the remote content to the remote system; and receiving, at the client device and over one or more of the networks, the remote content from the remote system responsive to transmitting the request.

In some versions of those implementations, the method can further include determining an actual latency to fulfill the assistant command based on obtaining the remote content from the remote system. In some further versions of those implementations, the method can further include updating the latency prediction model based on comparing the predicted latency to fulfill the assistant command and the actual latency to fulfill the assistant command.

In some implementations, the method can further include, subsequent to causing the pre-cached to be audibly rendered for presentation to the user via one or more of the speakers of the client device: causing the remote content to be audibly rendered for presentation to the user via one or more of the speaker of the client device. In some versions of those implementations, the pre-cached content that is tailored to the assistant and the remote content that is responsive to the assistant command can be audibly rendered as part of the same instance of synthesized speech.

In some implementations, causing the pre-cached content to be tailored to the assistant command can include causing one or more slot values for the pre-cached content to be filled based on the assistant command.

In some implementations, the method can further include, in response to determining not to modify the output to be provided for audible presentation to the user: generating a request for the remote content based on the assistant command; transmitting, from the client device and over one or more networks, the request for the remote content to the remote system; receiving, at the client device and over one or more of the networks, the remote content from the remote system responsive to transmitting the request; and causing the remote content to be provided for audible presentation to the user via one or more of the speakers of the client device.

In some implementations, a method implemented by one or more processors is provided, and includes receiving audio data that captures a spoken utterance of a user, the audio data being generated one or more microphones of a client device of the user; determining, based on processing the audio data that captures the spoken utterance of the user, an assistant command to be performed by an automated assistant; processing, using a latency prediction model, the assistant command to be performed by the automated assistant to generate a predicted latency for the automated assistant to fulfill the assistant command; obtaining remote content, from a remote system, to audibly render for presentation to the user to fulfill the assistant command, the remote content being generated by the remote system responsive to the spoken utterance; determining, based on the predicted latency for the automated assistant to fulfill the assistant command, whether to audibly render pre-cached content for presentation to the user prior to audibly rendering the remote content for presentation to the user, the pre-cached content being stored locally at the client device; and in response to determining to audibly render the pre-cached content for presentation to the user prior to audibly rendering the remote content, and while obtaining the remote content from the remote system: selecting the pre-cached content from among a plurality of disparate segments of pre-cached content, the selected pre-cached content being tailored to the assistant command; causing the pre-cached content to be audibly rendered for presentation to the user, via one or more speakers of the client device, as a first portion of synthesized speech; and in response to obtaining the remote content from the remote system: causing the remote content to be audibly rendered for presentation to the user, via one or more speakers of the client device, as a second portion of the synthesized speech.

In some implementations, a method implemented by one or more processors is provided, and includes receiving audio data that captures a spoken utterance of a user, the audio data being generated one or more microphones of a client device of the user; determining, based on processing the audio data that captures the spoken utterance of the user, an assistant command to be performed by an automated assistant; processing, using a latency prediction model, the assistant command to be performed by the automated assistant to generate a predicted latency for the automated assistant to fulfill the assistant command; determining, based on the predicted latency for the automated assistant to fulfill the assistant command, whether to audibly render pre-cached content for presentation to the user prior to audibly rendering remote content for presentation to the user, the pre-cached content being stored locally at the client device, and the remote content being generated by a remote system responsive to the spoken utterance; and in response to determining to audibly render the pre-cached content for presentation to the user prior to audibly rendering the remote content: determining whether the predicted latency for the automated assistant to fulfill the assistant command satisfies a first latency threshold or a second latency threshold; in response to determining the predicted latency for the automated assistant satisfies the first latency threshold, but not the second latency threshold: selecting a first segment of the pre-cached content, from among a plurality of disparate segments of pre-cached content, to be tailored to the assistant command. The first segment of the pre-cached content is audibly rendered for presentation to the user over a first duration of time; and causing the first segment of the pre-cached content to be audibly rendered for presentation to the user via one or more speakers of the client device. The method further includes, in response to determining the predicted latency for the automated assistant satisfies the first latency threshold and the second latency threshold: selecting a second segment of the pre-cached content, from among the plurality of disparate segments of pre-cached content, to be tailored to the assistant command. The second segment of the pre-cached content is audibly rendered for presentation to the user over a second duration of time, the second duration of time differs from the first duration of time; and causing the second segment of the pre-cached content to be audibly rendered for presentation to the user via one or more of the speakers of the client device.

In some implementations, a method implemented by one or more processors is provided, and includes receiving audio data that captures a spoken utterance of a user, the audio data being generated one or more microphones of a client device of the user; determining, based on processing the audio data that captures the spoken utterance of the user, an assistant command to be performed by an automated assistant; processing, using a latency prediction model, the assistant command to be performed by the automated assistant to generate a predicted latency for the automated assistant to fulfill the assistant command; determining, based on the predicted latency for the automated assistant to fulfill the assistant command, whether to audibly render pre-cached content for presentation to the user prior to audibly rendering on-device content for presentation to the user, the pre-cached content being stored locally at the client device, and the on-device content being generated locally at the client device responsive to the spoken utterance; and in response to determining to audibly render the pre-cached content for presentation to the user prior to audibly rendering the on-device content: causing the pre-cached content to be tailored to the assistant command; and causing the pre-cached to be audibly rendered for presentation to the user via one or more speakers of the client device.

These and other implementations of technology disclosed herein can optionally include one or more of the following features.

In some implementations, generating the on-device content locally at the client device can include generating a request for the on-device content based on the assistant command; transmitting the request for the on-device content to one or more software applications accessible at the client device; and receiving the on-device content from the one or more software application responsive to transmitting the request. In some versions of those implementations, the method can further include determining an actual latency to fulfill the assistant command based on generating the on-device content locally at the client device. In some further versions of those implementations, the method can further include updating the latency prediction model based on comparing the predicted latency to fulfill the assistant command and the actual latency to fulfill the assistant command.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
receiving audio data that captures a spoken utterance of a user, the audio data being generated one or more microphones of a client device of the user;
determining, based on processing the audio data that captures the spoken utterance of the user, an assistant command to be performed by an automated assistant;
determining, based on a predicted latency for the automated assistant to fulfill the assistant command, whether to audibly render pre-cached content for presentation to the user prior to audibly rendering responsive content for presentation to the user, the pre-cached content being stored locally at the client device, and the responsive content being generated by a remote system responsive to the spoken utterance or being generated locally at the client device responsive to the spoken utterance; and
in response to determining to audibly render the pre-cached content for presentation to the user prior to audibly rendering the responsive content:
determining whether to render a first segment of the pre-cached content, from among a plurality of disparate segments of pre-cached content, or to render a second segment of the pre-cached content, from among the plurality of disparate segments of pre-cached content;
in response to determining to render the first segment of pre-cached content:
obtaining the first segment of the pre-cached content, wherein the first segment of the pre-cached content is to be audibly rendered for presentation to the user over a first duration of time;
causing the first segment of the pre-cached content to be tailored to the assistant command; and
causing the first segment of the pre-cached content to be audibly rendered for presentation to the user via one or more speakers of the client device; and
in response to determining to render the second segment of pre-cached content:
obtaining the second segment of the pre-cached content, wherein the second segment of the pre-cached content is to be audibly rendered for presentation to the user over a second duration of time that differs from the first duration of time;
causing the second segment of the pre-cached content to be tailored to the assistant command; and
causing the second segment of the pre-cached content to be audibly rendered for presentation to the user via the one or more speakers of the client device.

2. The method of claim 1, wherein determining the assistant command to be performed by the automated assistant comprises:
processing, using an automatic speech recognition (ASR) model, the audio data that captures the spoken utterance of the user to generate ASR output;
processing, using a natural language understanding (NLU) model, the ASR output to generate NLU output; and
determining the assistant command to be performed by the automated assistant based on the NLU output.

3. The method of claim 2, further comprising:
processing, using a latency prediction model, the assistant command to be performed by the automated assistant to determine the predicted latency for the automated assistant to fulfill the assistant command.

4. The method of claim 3, wherein processing the assistant command using the latency prediction model to generate the latency prediction output comprises:
processing, using the latency prediction model, the NLU output to generate the predicted latency for the automated assistant to fulfill the assistant command.

5. The method of claim 4, wherein processing the assistant command using the latency prediction model to generate the latency prediction output further comprises:
processing, using the latency prediction model, and along with the NLU output, one or more client device signals to generate the predicted latency for the automated assistant to fulfill the assistant command, wherein the one or more client device signals include one or more of: a location of the client device of the user, a type of the client device of the user, or a network connection type of the client device of the user.

6. The method of claim 2, wherein the NLU output includes an intent of the user.

7. The method of claim 5, wherein the NLU output further includes one or more slot values for one or more corresponding parameters associated with the intent of the user.

8. The method of claim 1, wherein determining to render the first segment of pre-cached content is based on determining that the predicted latency for the automated assistant to fulfill the assistant command fails to satisfy a first latency threshold.

9. The method of claim 8, wherein determining to render the second segment of pre-cached content is based on determining that the predicted latency for the automated assistant to fulfill the assistant command satisfies the first latency threshold but fails to satisfy a second latency threshold.

10. The method of claim 1, wherein the responsive content is remote content generated by the remote system responsive to the spoken utterance.

11. The method of claim 10, further comprising:
obtaining the remote content from the remote system, wherein obtaining the remote content from the remote system comprises:
generating a request for the remote content based on the assistant command;
transmitting, from the client device and over one or more networks, the request for the remote content to the remote system; and
receiving, at the client device and over one or more of the networks, the remote content from the remote system responsive to transmitting the request.

12. The method of claim 1, wherein the responsive content is on-device content generated locally at the client device responsive to the spoken utterance.

13. The method of claim 12, wherein generating the on-device content locally at the client device comprises:
   generating a request for the on-device content based on the assistant command;
   transmitting the request for the on-device content to one or more software applications accessible at the client device; and
   receiving the on-device content from the one or more software application responsive to transmitting the request.

14. The method of claim 1, further comprising:
   subsequent to causing the first segment of the pre-cached content or the second segment of the pre-cached content to be audibly rendered for presentation to the user via the one or more of the speakers of the client device:
      causing the responsive content to be audibly rendered for presentation to the user via the one or more of the speakers of the client device.

15. The method of claim 12, wherein the first segment of the pre-cached content or the second segment of the pre-cached content that is tailored to the assistant command and the responsive content that is responsive to the assistant command are audibly rendered as part of the same instance of synthesized speech.

16. The method of claim 1, wherein causing the first segment of the pre-cached content or the second segment of the pre-cached content to be tailored to the assistant command comprises:
   causing one or more slot values for the pre-cached content to be filled based on the assistant command.

17. A client device comprising:
   one or more microphones;
   one or more speakers;
   memory storing instructions; and
   one or more processors that are operable to execute the instructions stored in the memory to:
      receive audio data that captures a spoken utterance of a user, the audio data being generated the one or more microphones of the client device of the user;
      determine, based on processing the audio data that captures the spoken utterance of the user, an assistant command to be performed by an automated assistant;
      determine, based on a predicted latency for the automated assistant to fulfill the assistant command, whether to audibly render pre-cached content for presentation to the user prior to audibly rendering responsive content for presentation to the user, the pre-cached content being stored locally at the client device, and the responsive content being generated by a remote system responsive to the spoken utterance or being generated locally at the client device responsive to the spoken utterance; and
      in response to determining to audibly render the pre-cached content for presentation to the user prior to audibly rendering the responsive content:
         determine whether to render a first segment of the pre-cached content, from among a plurality of disparate segments of pre-cached content, or to render a second segment of the pre-cached content, from among the plurality of disparate segments of pre-cached content;
         in response to determining to render the first segment of pre-cached content:
            obtain the first segment of the pre-cached content, wherein the first segment of the pre-cached content is to be audibly rendered for presentation to the user over a first duration of time;
            cause the first segment of the pre-cached content to be tailored to the assistant command; and
            cause the first segment of the pre-cached content to be audibly rendered for presentation to the user via one or more speakers of the client device; and
         in response to determining to render the second segment of pre-cached content:
            obtain the second segment of the pre-cached content, wherein the second segment of the pre-cached content is to be audibly rendered for presentation to the user over a second duration of time that differs from the first duration of time;
            cause the second segment of the pre-cached content to be tailored to the assistant command; and
            cause the second segment of the pre-cached content to be audibly rendered for presentation to the user via the one or more speakers of the client device.

18. A non-transitory computer-readable storage medium storing instructions that are executable by one or more processors to cause operations to be performed, the operations comprising:
   receiving audio data that captures a spoken utterance of a user, the audio data being generated one or more microphones of a client device of the user;
   determining, based on processing the audio data that captures the spoken utterance of the user, an assistant command to be performed by an automated assistant;
   determining, based on a predicted latency for the automated assistant to fulfill the assistant command, whether to audibly render pre-cached content for presentation to the user prior to audibly rendering responsive content for presentation to the user, the pre-cached content being stored locally at the client device, and the responsive content being generated by a remote system responsive to the spoken utterance or being generated locally at the client device responsive to the spoken utterance; and
   in response to determining to audibly render the pre-cached content for presentation to the user prior to audibly rendering the responsive content:
      determining whether to render a first segment of the pre-cached content, from among a plurality of disparate segments of pre-cached content, or to render a second segment of the pre-cached content, from among the plurality of disparate segments of pre-cached content;
      in response to determining to render the first segment of pre-cached content:
         obtaining the first segment of the pre-cached content, wherein the first segment of the pre-cached content is to be audibly rendered for presentation to the user over a first duration of time;
         causing the first segment of the pre-cached content to be tailored to the assistant command; and
         causing the first segment of the pre-cached content to be audibly rendered for presentation to the user via one or more speakers of the client device; and
      in response to determining to render the second segment of pre-cached content:
         obtaining the second segment of the pre-cached content, wherein the second segment of the pre-cached content is to be audibly rendered for presentation to the user over a second duration of time that differs from the first duration of time;
         causing the second segment of the pre-cached content to be tailored to the assistant command; and causing the second segment of the pre-cached content to be audibly rendered for presentation to the user via the one or more speakers of the client device.

* * * * *